US012513351B1

(12) United States Patent
Qiu et al.

(10) Patent No.: US 12,513,351 B1
(45) Date of Patent: Dec. 30, 2025

(54) SYSTEM AND METHOD FOR MULTI-PERSON INTERACTION FOR A LIVESTREAM BROADCAST

(71) Applicant: HYTTO PTE. LTD, Singapore (SG)

(72) Inventors: Jilin Qiu, Singapore (SG); Hui Liao, Guangdong (CN); Jun Han, Guangdong (CN)

(73) Assignee: HYTTO PTE. LTD, Singapore (SG)

( * ) Notice: Subject to any disclaimer, the term of this patent is extended or adjusted under 35 U.S.C. 154(b) by 0 days.

(21) Appl. No.: 19/256,808

(22) Filed: Jul. 1, 2025

(51) Int. Cl.
*H04N 21/258* (2011.01)
*H04N 21/2187* (2011.01)
*H04N 21/472* (2011.01)
*H04N 21/4788* (2011.01)

(52) U.S. Cl.
CPC ... *H04N 21/25808* (2013.01); *H04N 21/2187* (2013.01); *H04N 21/472* (2013.01); *H04N 21/4788* (2013.01)

(58) Field of Classification Search
CPC .......... H04N 21/2187; H04N 21/4316; H04N 21/4725; H04N 21/4788; A61H 19/00; A61H 2201/5097; G06T 7/20; G06T 7/90
See application file for complete search history.

(56) References Cited

U.S. PATENT DOCUMENTS

| | | | |
|---|---|---|---|
| 9,762,515 B1* | 9/2017 | Olivares | G06Q 20/18 |
| 10,097,875 B2* | 10/2018 | Strong | H04N 21/440281 |
| 11,983,822 B2 | 5/2024 | Estee | |
| 2020/0009009 A1* | 1/2020 | Nishida | A63F 13/215 |
| 2020/0289363 A1* | 9/2020 | Liu | A61H 1/00 |

\* cited by examiner

*Primary Examiner* — Alazar Tilahun
(74) *Attorney, Agent, or Firm* — Keefe IP Law, PLLC

(57) ABSTRACT

An interactive method is disclosed. The interactive method includes forming, via a system, one or more virtual containers, wherein the one or more virtual containers are managed by at least one of a first terminal associated with a first user or a service provider. Managing the virtual containers includes managing a browsing target that includes a target website for browsing online entertainment content. The interactive method also includes appending, via the system, a virtual user identity of a second terminal associated with a second user to the one or more virtual containers, and in response to an interactive operation of the second terminal on the one or more virtual containers, configuring, via the system, the second terminal to bind to the browsing target, which is the same browsing target as the first terminal.

21 Claims, 20 Drawing Sheets

SYSTEM AND METHOD FOR MULTI-PERSON INTERACTION FOR A LIVESTREAM BROADCAST

FIELD OF THE INVENTION

The present disclosure generally relates to a system and method for multi-person interaction, and more particularly to a system and method for multi-person interaction for a livestream broadcast.

BACKGROUND OF THE INVENTION

Models, such as pornographic models, often engage in livestreaming erotic videos to viewers as a safe and lucrative way to engage in erotic work. Such livestreaming typically involves tipping of models performing in a livestream by viewers of the livestream.

Tipping typically involves an imbalance among users, with a relatively small number of tippers providing a large share of aggregate tipping. For example, 20% of top tipping viewers of livestream broadcasts often contribute the vast majority of total rewards to models. Accordingly, a given audience typically includes a relatively small number of top tipping viewers who tip a relatively large portion of aggregate tips and a relatively large amount of ordinary viewers who tip a relatively small portion of aggregate tips.

In view of this tipping imbalance, ordinary viewers who either tip low amounts or do not tip at all often are unable to interact with the model in some systems without tipping or can have a low sense of confidence and reluctance to actively participate and interact with models in livestream broadcasts. This can reduce overall activity and viewer presence in a livestream broadcast room.

Tipping imbalances can therefore negatively affect the overall atmosphere of a livestream broadcast room. Because livestream broadcast rooms may include relatively large numbers of relatively passive or inactive viewers, overall interaction and activity in the rooms may be relatively low.

The exemplary disclosed system and method are directed to overcoming one or more of the shortcomings set forth above and/or other deficiencies in existing technology.

SUMMARY OF THE INVENTION

In one exemplary aspect, the present disclosure is directed to an interactive method. The interactive method includes forming, via a system, one or more virtual containers, wherein the one or more virtual containers are managed by at least one of a first terminal associated with a first user or a service provider. Managing the virtual containers includes managing a browsing target that includes a target website for browsing online entertainment content. The interactive method also includes appending, via the system, a virtual user identity of a second terminal associated with a second user to the one or more virtual containers, in response to an interactive operation of the second terminal on the one or more virtual containers, configuring, via the system, the second terminal to bind to the browsing target, which is the same browsing target as the first terminal, sending, via the system, associated resources that are associated with the browsing target to the second terminal, in response to determining the browsing target by the first terminal, and in response to determining a first browsing target by the first terminal: controlling via the system the second terminal to access the first browsing target according to the associated resources, and prompting via the system an interface display of the second terminal to display the online entertainment content according to the first browsing target that is the same as the online entertainment content displayed on at least a part of an interface display of the first terminal.

In another aspect, the present disclosure is directed to a system. The system includes at least one module comprising computer-executable code stored in non-volatile memory; and a memory for storing instructions and a processor for executing the instructions. The computer-executable code, when operating on the processor, causes the system to form, via the system, one or more virtual containers, wherein the one or more virtual containers are managed by at least one of a first terminal or a service provider; form, via the system, one or more virtual containers, wherein the one or more virtual containers are managed by at least one of a first terminal associated with a first user or a service provider, wherein managing the virtual containers includes managing a browsing target that includes a target website for browsing online entertainment content, and append, via the system, a virtual user identity of a second terminal associated with a second user to the one or more virtual containers, in response to an interactive operation of the second terminal on the one or more virtual containers. The computer-executable code, when operating on the processor, also causes the system to configure, via the system, the second terminal to bind to the browsing target, which is the same browsing target as the first terminal, send, via the system, associated resources that are associated with the browsing target to the second terminal, in response to determining the browsing target by the first terminal, and in response to determining a first browsing target by the first terminal: control via the system the second terminal to access the first browsing target according to the associated resources, and prompt via the system an interface display of the second terminal to display the online entertainment content according to the first browsing target that is the same as the online entertainment content displayed on at least a part of an interface display of the first terminal.

DETAILED DESCRIPTION AND INDUSTRIAL APPLICABILITY

Figure 1:
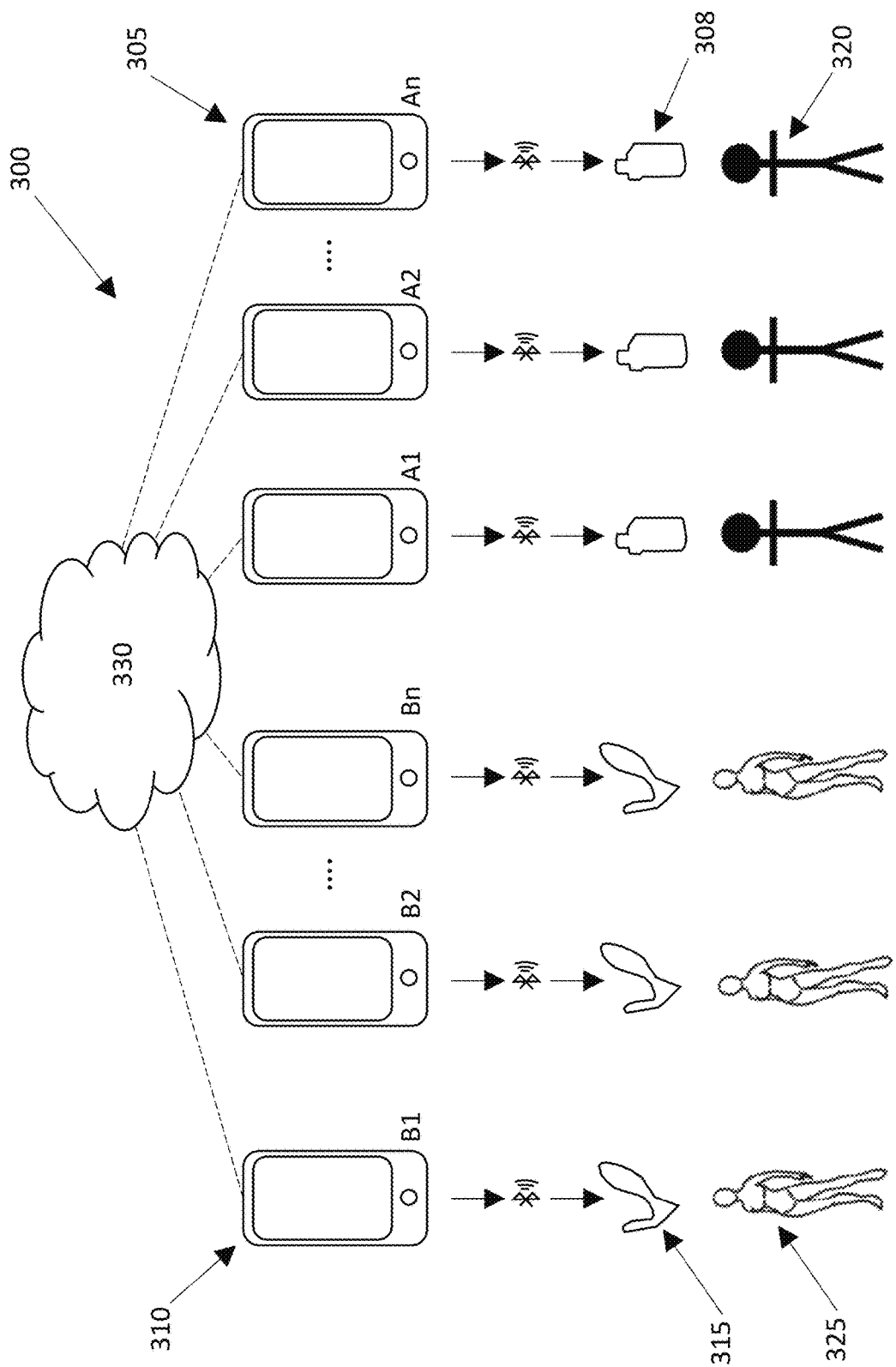
FIG. 1 is a schematic illustration of an exemplary system of the present invention.

FIG. 1 illustrates an exemplary system 300 for providing a live broadcast (e.g., a livestream) including for example providing increased interaction of viewers who have entered a livestream broadcast room. System 300 may provide for one or more top tipping viewers to lead a group or team of viewers, which may facilitate participation in the livestream broadcast room (e.g., interaction with models) by ordinary viewers (e.g., low-tipping or non-tipping viewers). Also, system 300 may provide (e.g., at the same time provide) social and/or entertainment benefits to the one or more top tipping viewers and/or ordinary viewers (e.g., and/or monetary benefits to models), which may make an atmosphere (e.g., social atmosphere) in a given model's livestream broadcast room more active. System 300 may provide top tipping viewers with a sense of accomplishment (e.g., social accomplishment) from being followed by other viewers, which may enhance their influence-driven consumption motivation (e.g., which may also provide monetary benefits to models). For example, system 300 may provide top tipping viewers with the feeling that they are playing an "influencer" role on the platform, which they may find personally rewarding. System 300 may allow ordinary viewers to transition (e.g., shift or evolve) from "single-person viewing" to "multi-person screen interaction" and thereby receive increased entertainment benefit (e.g., amplify an entertainment effect) through collective behavior such as, for example, simultaneous rewards (e.g., with one or more top tipping viewers) and/or barrage interaction.

As illustrated in FIG. 1, system 300 may include one or more male user devices 305, one or more female user devices 310, one or more male accessories 308, and/or one or more female accessories 315. For example, system 300 may include a plurality of male user devices 305, a plurality of male accessories 308, a plurality of female user devices 310, and a plurality of female accessories 315. Data such as image data, audio data, and/or control data may be transferred between male user devices 305, male accessories 308, female user devices 310, and female accessories 315. These exemplary disclosed components and/or modules and/or other exemplary disclosed components described below may be included in the exemplary disclosed first terminal and/or second terminal (e.g., and/or management terminal and/or creator or model terminal) described below.

Returning to FIG. 1, system 300 may include any desired number of male user devices 305 (e.g., A1, A2, . . . . An). Male user device 305 may be any suitable device for interfacing with other components of system 300 such as a computing device (e.g., user interface). For example, male user device 305 may be any suitable user interface for receiving input and/or providing output (e.g., image data) to a male user 320. Male user device 305 may include a camera and a microphone. Male user device 305 may be, for example, a touchscreen device (e.g., of a smartphone, a tablet, a smartboard, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 300, and/or any other suitable user interface (e.g., including components and/or configured to work with components described below regarding FIGS. 13 and 14). For example, male user device 305 may include a touchscreen device of a smartphone or handheld tablet. For example, male user device 305 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. An application for example as described herein and/or a web browser may be installed on male user device 305 and utilized by male user 320.

Figure 2:
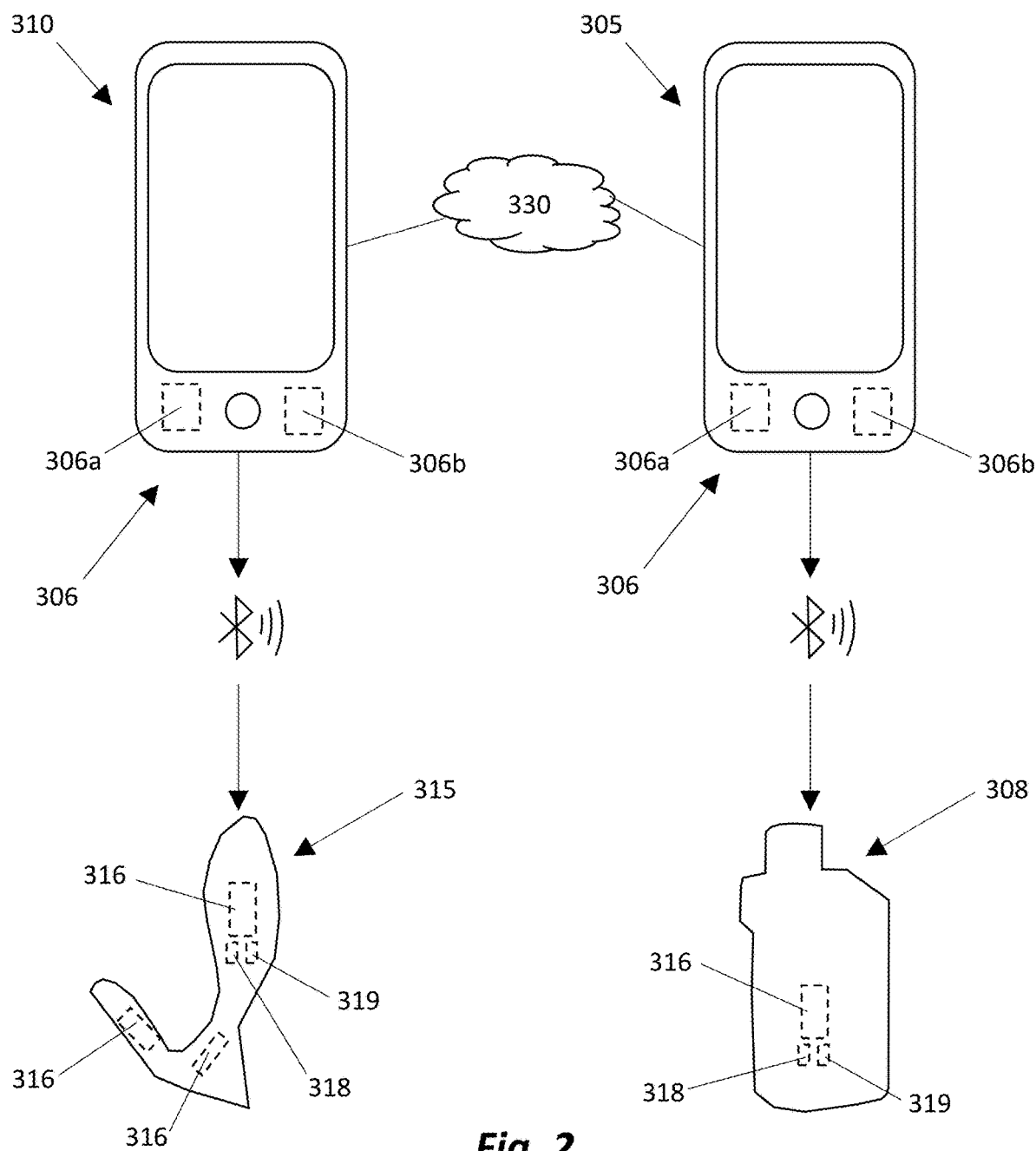
FIG. 2 is schematic illustration of exemplary accessories of the exemplary disclosed system.

As illustrated in FIG. 2, male user device 305 may include a sensor array 306. In at least some exemplary embodiments, sensor array 306 may include one or more sensors integrated or built into the exemplary disclosed user device (e.g., male user device 305) such as, for example, a mobile phone, a pad, or a wearable device. Sensor array 306 may include any suitable sensors for use with system 300 such as, for example, a location sensor 306a and a movement sensor 306b. Location sensor 306a may include a GPS device, a Galileo device, a GLONASS device, an IRNSS device, a BeiDou device, and/or any other suitable device that may operate with a global navigation system.

Movement sensor 306b may include any suitable components for sensing motion (e.g., motion amplitude), velocity, and/or acceleration. Movement sensor 306b may include an acceleration sensor. Movement sensor 306b may include a gyroscope. For example, movement sensor 306b may include a displacement sensor, a velocity sensor, and/or an accelerometer. For example, movement sensor 306b may include components such as a servo accelerometer, a piezoelectric accelerometer, a potentiometric accelerometer, and/or a strain gauge accelerometer. Movement sensor 306b may include a piezoelectric velocity sensor or any other suitable type of velocity or acceleration sensor.

System 300 may include any desired number of female user devices 310 (e.g., B1, B2, . . . . Bn). Female user device 310 may be similar to male user device 305. For example, female user device 310 may be any suitable user interface for receiving input and/or providing output (e.g., image data) to a female user 325. Female user 325 may operate female user device 310 to record and transfer image (e.g., video) and audio data to one or more male users 320 and/or other female users 325 via a network 330. Additional exemplary disclosed devices and/or users of any desired gender may also be included in the exemplary disclosed system (e.g., a non-binary user and/or a non-binary user device and/or non-binary accessory similar to the examples described herein).

Female accessory 315 may be any suitable accessory for use by female user 325 (e.g., when female user 325 is imaged by female user device 310). For example, female accessory 315 may be a prop that is used by female user 325 while female user 325 is being imaged (e.g., a video or pictures of female user 325 are being recorded and/or transmitted in real-time to be viewed by male user 320 and/or another female user 325). For example, female accessory 315 may be a device used for erotic stimulation (e.g., a sex aid or a "sex toy"). Female accessory 315 may be a sexual stimulation device that may be associated with a given female user 325 and respective female user device 310 of that given female user 325. In at least some exemplary embodiments, female accessory 315 may be a massaging apparatus for human genitalia (e.g., a vibrator). For example, female accessory 315 may be any suitable device for use in a video or pictures recorded by female user device 310, which may be an erotic video or erotic pictures). In at least some exemplary embodiments, female accessory 315 may be a tool or other indicator that may be used in video or pictures recorded by female user device 310 such as a sign providing information such as location or time information, a surveillance tool used by female user 325, and/or any other suitable tool or accessory that may be used while female user device 310 is recording a video or pictures of female user 325. For example, female user 325 may be an erotic model using female accessory 315 that may be an erotic device, a technician or laborer using female accessory 315 that may be a tool or work device specific to a desired application, and/or any other desired role using any suitable female accessory 315.

Female accessory 315 may include one or more driving components such as one or more motors 316. Motor 316 may include an electric motor. Motor 316 may include a servomotor, a stepper motor, a brushless motor, or any other suitable type of motor. Motor 316 may include any suitable vibration motor or haptic motor such as, for example, a mini vibrator motor. Motor 316 may include a low voltage motor. Motor 316 may include a pager motor or a coin vibration motor. Motor 316 may include a linear resonant actuator or an eccentric rotating mass vibration motor. Motor 316 may be a reversible electric motor (e.g., a reversible electric motor). Motor 316 may be a unidirectional motor (e.g., a one-way motor). Motor 316 may be powered by any suitable power source, such as a battery (e.g., a nickel-metal hydride battery, a lithium-ion battery, an ultracapacitor battery, a lead-acid battery, and/or a nickel cadmium battery), an electric power source (e.g., a transformer connected to a plug that may plug into an outlet), and/or any other suitable energy source. Female accessory 315 may include a controller 319 that may be any suitable computing device for controlling an operation of motor 316 and a communication device 318. Controller 319 may, for example, include components similar to the components described below regarding FIG. 13. Controller 319 may include for example a processor (e.g., micro-processing logic control device) or board components. Controller 319 may control one or more motors 316 based on input data and/or commands (e.g., control commands) received from male user device 305 and/or female user device 310 via a network 330 and/or communication device 318 (e.g., transferred directly to communication device 318 by any suitable component of system 300). Motor 316 may be controlled by controller 319 to vibrate female accessory 315 at a desired level or strength, perform a suction operation at a desired level or strength using female accessory 315 (e.g., using female accessory 315 as a suction device), rotate or swing female accessory 315 at a desired speed or amount, contract or expand female accessory 315 by a desired amount, cause female accessory 315 to perform an inhalation action, and/or cause female accessory 315 to perform any other suitable action or function.

In at least some exemplary embodiments, motor 316 may be or may include a thermal device such as a heater (e.g., or a cooler or any other suitable thermal device). Alternatively for example, a heater unit and the exemplary disclosed motor may be separately provided (e.g., installed) in the exemplary disclosed adult toy. In at least some exemplary embodiments, motor 316 may include an electric heating device such as an electric resistance heating device. Motor 316 may include a polyimide heater, a silicone rubber heater, and/or a resistive wire heater. Motor 316 may be controlled by controller 319 to heat or emit heat or warmth from female accessory 315. For example, motor 316 may cause a temperature variation of female accessory 315.

Returning to FIG. 2, male accessory 308 may include components generally similar to female accessory 315 and may operate generally similarly to female accessory 315. Male accessory 308 may be a sexual stimulation device that may be associated with a given male user 320 (e.g., a viewer of one or more female users 325 and/or male users 320; or a male model) and respective male user device 305 (e.g., a viewer device) of that given male user 320.

Network 330 may be any suitable communication network over which data may be transferred between one or more male user devices 305, one or more male accessories 308, one or more female user devices 310, and/or one or more female accessories 315. Network 330 may be the internet, a LAN (e.g., via Ethernet LAN), a WAN, a WiFi network, or any other suitable network. Network 330 may be similar to WAN 201 described below. The components of system 300 may also be directly connected (e.g., by wire, cable, USB connection, and/or any other suitable electro-mechanical connection) to each other and/or connected via network 330. For example, components of system 300 may wirelessly transmit data by any suitable technique such as, e.g., wirelessly transmitting data via 4G LTE networks (e.g., or 5G networks) or any other suitable data transmission technique for example via network communication. Components of system 300 may transfer data via the exemplary techniques described below regarding FIG. 14. Male user devices 305, male accessories 308, female user devices 310, and/or female accessories 315 may include any suitable communication components for communicating with other components of system 300 using for example the communication techniques described above. For example, male user devices 305 and female user devices 310 may include integrally formed communication devices (e.g., smartphone components), and male accessories 308 and female accessories 315 may each include communication device 318 that may communicate using any of the exemplary disclosed communication techniques.

In at least some exemplary embodiments, a given female accessory 315 may communicate with a given female user device 310 (e.g., a paired female user device 310) via any suitable short distance communication technique. For example, female accessories 315 (e.g., via communication device 318) and female user devices 310 may communicate via Wifi, Bluetooth, ZigBee, NFC, IrDA, and/or any other suitable short distance technique. Female accessory 315 may be an adult toy that may be connected with female user device 310 through short distance wireless communication. An application (e.g., operating using the exemplary disclosed modules) may be installed on female user device 310, the application and female user device 310 being configured to send commands to female accessory 315 to drive (e.g., actuate) female accessory 315. Male accessory 308 may communicate with male user device 305 similarly to the communication of female accessory 315 and female user device 310 described above.

System 300 may include one or modules for performing the exemplary disclosed operations such as, for example, the exemplary disclosed modules for example as described herein. The one or more modules may include an accessory control module for controlling male accessory 308 and female accessory 315. The one or more modules may be stored and operated by any suitable components of system 300 (e.g., including processor components) such as, for example, network 330, male user device 305, male accessory 308, female user device 310, female accessory 315, and/or any other suitable component of system 300. For example, system 300 may include one or more modules having computer-executable code stored in non-volatile memory. System 300 may also include one or more storages (e.g., buffer storages) that may include components similar to the exemplary disclosed computing device and network components described below regarding FIGS. 13 and 14. For example, the exemplary disclosed buffer storage may include components similar to the exemplary storage medium and RAM described below regarding FIG. 13. The exemplary disclosed buffer storage may be implemented in software and/or a fixed memory location in hardware of system 300. The exemplary disclosed buffer storage (e.g., a data buffer) may store data temporarily during an operation of system 300.

The one or more exemplary disclosed modules may include software modules running on model equipment. The software modules may include a smart panel (e.g., as described below), game plug-ins, and/or toy control plug-ins (e.g., for the exemplary disclosed toys) that may assist models in live broadcasting.

Figure 3:
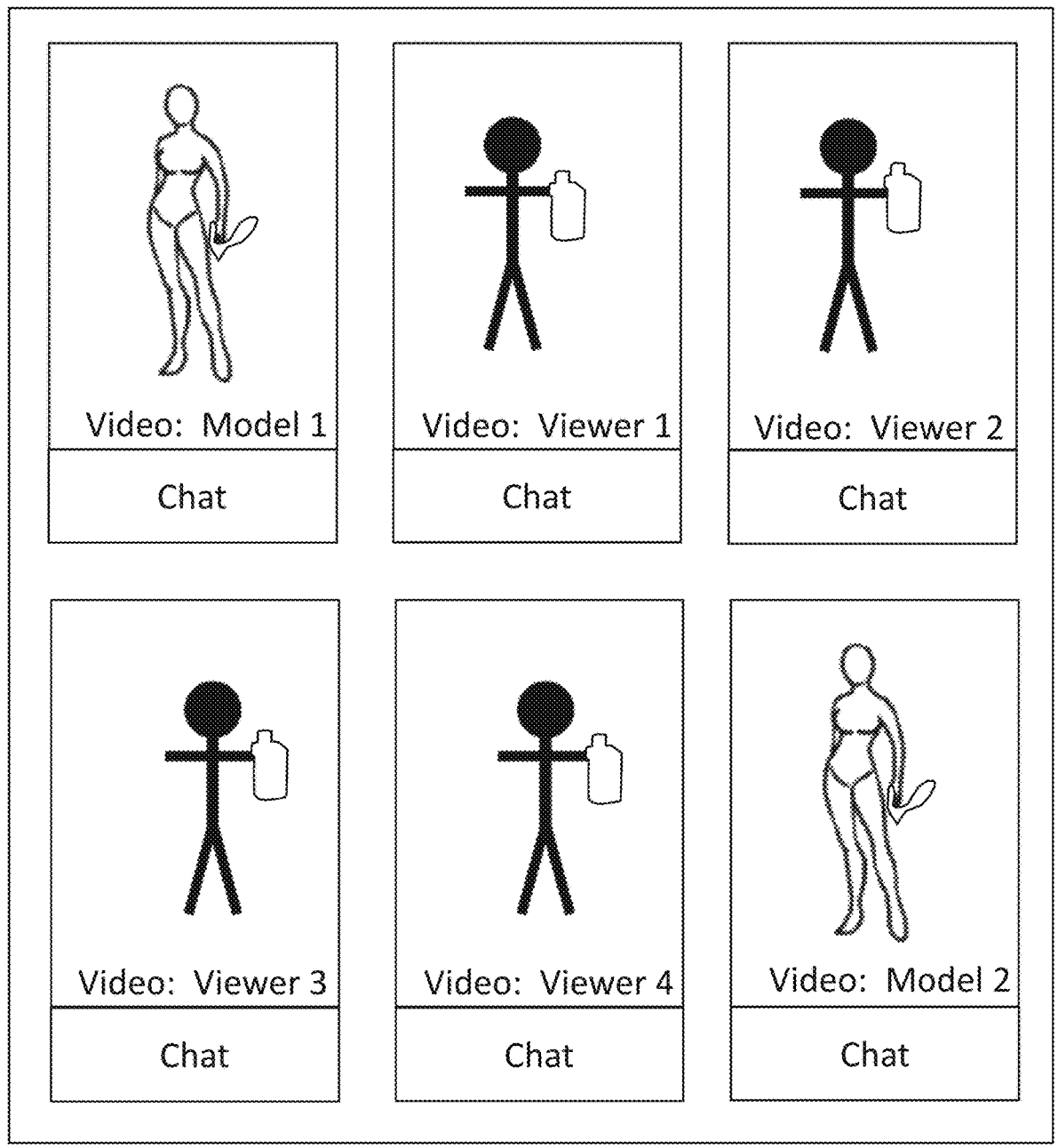
FIG. 3 is a schematic illustration of an exemplary embodiment of the exemplary disclosed system.

The one or more exemplary disclosed modules may also provide a livestream broadcast room and/or chat room interface via one or more male user devices 305 and/or one or more female user devices 310 for use by male users 320 and female users 325. For example, video display of female user 325, one or more male users 320, and/or and a chat or messaging app (e.g., any suitable chat communication or messaging app such as, for example, text, voice, and/or video chat boxes) may be displayed to each male user 320 via male user device 305 and to each female user 325 via female user device 310. One or more male users 320 and one or more female users 325 may thereby view and chat (e.g., text, voice, and/or video chat) with each other via the one or more exemplary disclosed modules via respective male user devices 305 and female user devices 310. Male users 320 and female users 325 may thereby view, interact with, and/or chat (e.g., text, voice, and/or video chat) with other female users 325 and/or other male users 320 (e.g., and/or any other users of an gender such as non-binary users as described above or any other gender). For example, multiple text, voice, and/or video chat boxes including a plurality of male users 320 (e.g., viewers or models each having one or more male accessories 308) and/or a plurality of female users 325 (e.g., viewers or models each having one or more female accessories 315) may be displayed to each male user 320 and each female user 325 via respective male user devices 305 and female user devices 310. Male users 320 and female users 325 may thereby view and interact with other male users 320 and female users 325 that may each have one or more respective accessories (e.g., respective male accessories 308 and female accessories 315). FIG. 3 schematically illustrates an exemplary embodiment of the exemplary disclosed chat room that may be displayed to male user 320 via male user device 305 and/or to female user 325 via female user device 310.

Figure 4:
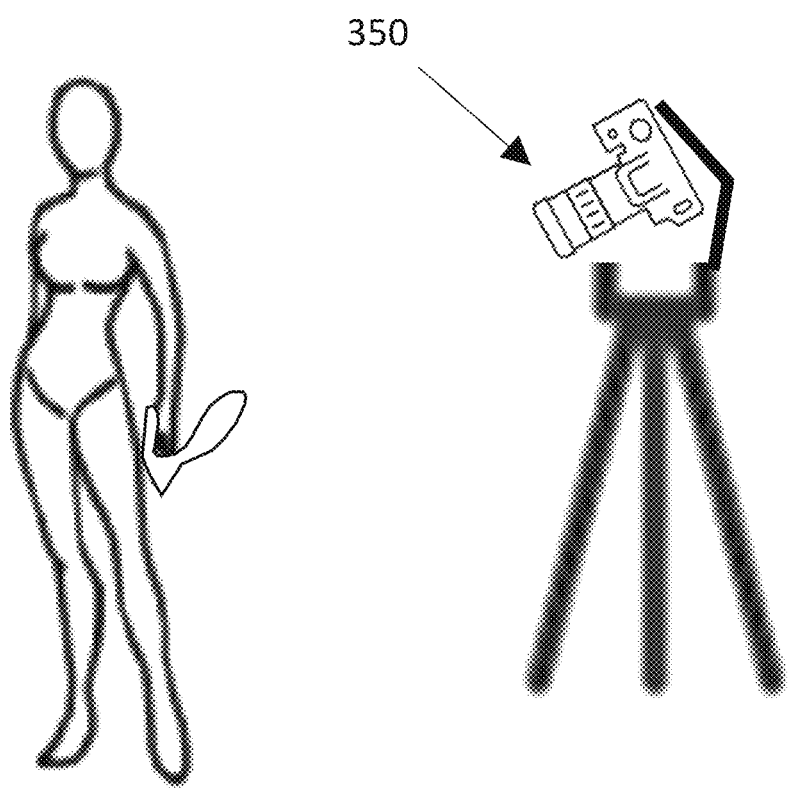
FIG. 4 is a schematic illustration of an exemplary embodiment of the exemplary disclosed system.

In at least some exemplary embodiments and as illustrated in FIG. 4, system 300 may further include an imaging device 350. Imaging device 350 may be used directly and/or indirectly to provide data to be used in an operation of system 300. For example, imaging device 350 may be a camera that may be used to obtain user input (e.g., data of gesturing images made by the user) by any suitable imaging technique (e.g., for example as described herein).

Imaging device 350 may be any suitable imaging device such as a camera. For example, imaging device 350 may be any suitable video camera such as a digital video camera, a webcam, and/or any other suitable camera for recording visual data (e.g., recording a video or taking pictures) and/or image recognition. Imaging device 350 may be a 3D camera. Imaging device 350 may be a headset that may be worn by a user (e.g., male user 320 or female user 325). Imaging device 350 may be a spatial computing device (e.g., a spatial computer). Imaging device 350 may utilize any suitable spatial computing features and/or techniques (e.g., similar to Apple Vision Pro). Imaging device 350 may be for example a three-dimensional video sensor or camera. One or more imaging devices 350 may include a plurality of cameras or a single camera configured to collect three-dimensional image data. In at least some exemplary embodiments, imaging device 350 may be a stereoscopic camera and/or any other suitable device for stereo photography, stereo videography, and/or stereoscopic vision. Imaging device 350 may be substantially entirely integrated into the exemplary disclosed user devices or may be a stand-alone device. In at least some exemplary embodiments, imaging device 350 may be a smartphone or tablet camera. Imaging device 350 may provide data to an exemplary image recognition module of system 300. Imaging device 350 may include one or more actuators that may adjust a position of imaging device 350 based on an operation of system 300 (imaging device 350 may also include a support or stand for supporting imaging device 350). The actuators may be for example one or more external actuators disposed at an exterior of imaging device 350 and/or one or more integrated actuators that are completely or partially integrated into imaging device 350 (e.g., disposed and/or integrated within an interior of imaging device 350). In at least some exemplary embodiments, the actuators may be internally integrated into imaging device 350 and may turn optical components and/or move lenses of imaging device 350 within a housing of imaging device 350 to zoom in and out at different features or points within a variable field of view of imaging device 350 (e.g., zoom in and out on points or features of a user and/or exemplary disclosed accessories). The actuator may also be one or more external and/or internally-integrated mechanical actuators configured to mechanically turn imaging device 350 and move lenses of imaging device 350 to focus in and out at desired objects (e.g., points and/or features of a user and/or an accessory). System 300 may also include an image recognition module that may perform feature detection and matching to allow for matching and comparison of features imaged by imaging device 350. For example, imaging device 350 may find predetermined features that may correspond to two-dimensional and/or three-dimensional surfaces and/or contours of an object within a field of view of imaging device 350. Also for example, any suitable technique may be used to identify features (e.g., spatial data) of a viewed object (e.g., features of a user and/or accessory) and to match those imaged features to predetermined features provided by system 300 (e.g., or provided by a user). Also for example, optical character recognition of text and/or markings located on a viewed object may be performed. For example, spatial data and/or other data may be determined that may be matched to predetermined data provided by system 300 (e.g., predetermined shapes, colors, text, contours, and other features). For example, the spatial data and/or other data may include data defining points (e.g., or contours) of a user and/or accessory based on an actual image of an object (e.g., the exemplary disclosed accessories) imaged by imaging device 350. For example, spatial and/or data based on viewing an object may be used to match that data to predetermined data to identify points or features of an object being viewed. Any suitable techniques for recognizing objects and/or determining spatial and/or other data of a viewed object may be utilized by system 300 for image recognition via imaging device 350.

The exemplary disclosed first terminal and/or second terminal disclosed herein may incorporate some, substantially all of, or components of one or more of the exemplary disclosed male user devices 305, female user devices 310, male accessories 308, female accessories 315, network 330, imaging device 350, exemplary disclosed modules, components described below regarding FIGS. 13 and/or 14, and/or any other suitable software and/or hardware components. The exemplary disclosed first terminal or second terminal may be associated with the exemplary disclosed audience device (e.g., male user device 305 or female user device 310), which may be used by a user such as a viewer or viewer user (e.g., female user 325 or male user 320).

The exemplary disclosed system and method may be used in any suitable application involving a livestream broadcast room. The exemplary disclosed system and method may be used in any suitable application for providing tipping during a live broadcast. The exemplary disclosed system and method may be used in any suitable application involving a model livestreaming a video to an audience including a plurality of viewers for tips. For example, the exemplary disclosed system and method may be used in any suitable application for providing a livestream erotic broadcast and receiving tipping during the broadcast.

Figure 5:
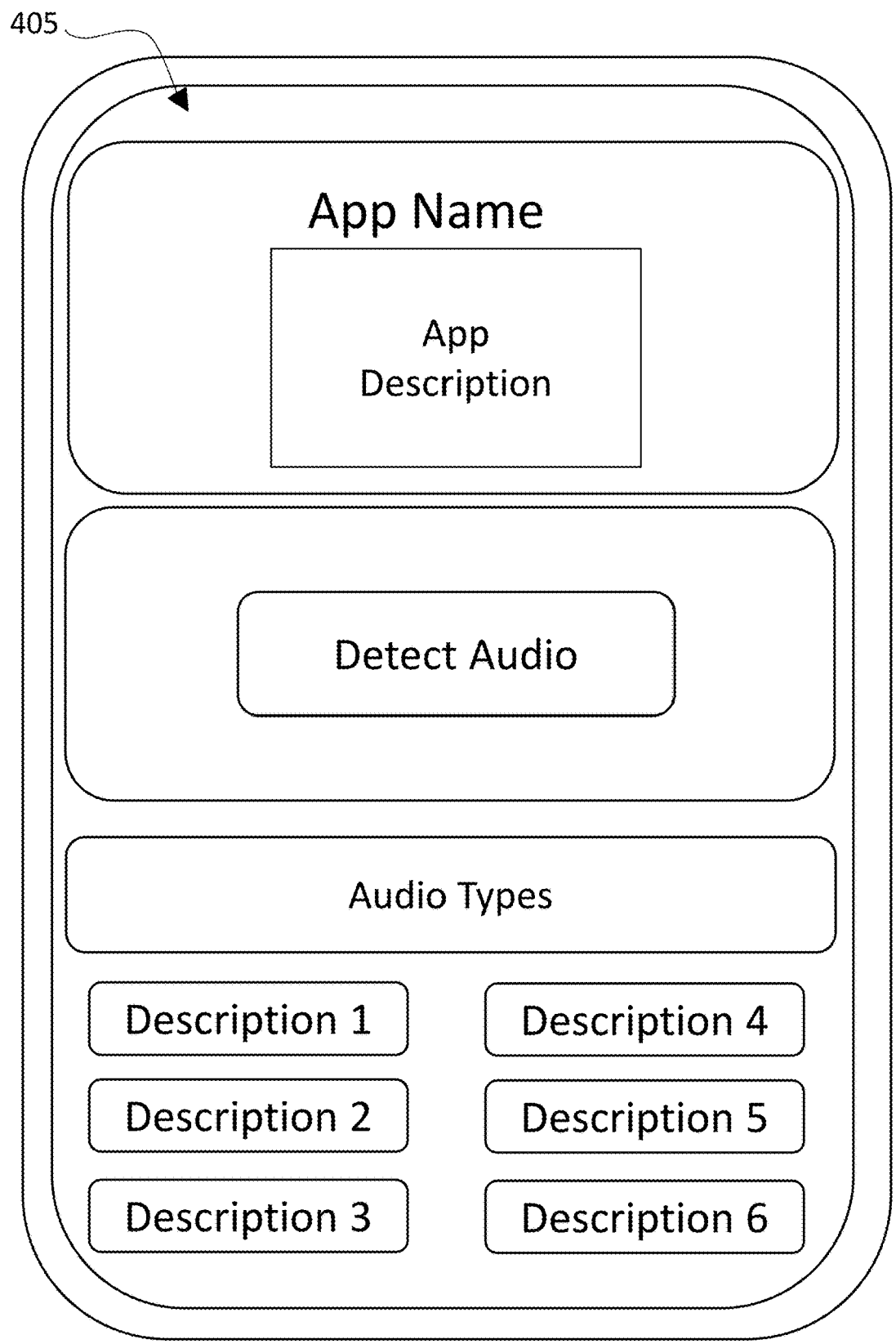
FIG. 5 is a schematic illustration of an exemplary embodiment of the exemplary disclosed system.

In at least some exemplary embodiments and for example as illustrated in FIG. 5, graphical elements provided by system 300 may be displayed on a graphical user interface such as a GUI 405 on a display or touchscreen of the exemplary disclosed user device (e.g., male user device 305, female user device 310, and/or any other suitable user device) to the user (e.g., or a spatial computing interface such as for example similar to Apple Vision Pro). Any suitable graphical element (e.g., text, graphics, GIFs, video, and/or any other suitable graphics) may be displayed on GUI 405. GUI 405 may display the exemplary disclosed live broadcast and/or data and/or elements associated with the live broadcast (e.g., input data, output data, control elements, graphical elements, information, and/or any other suitable data and/or objects) to one or more viewers and/or models (e.g., one or more female users 325 and/or male users 320) via one or more exemplary disclosed user devices (e.g., one or more female user devices 310 and/or one or more male user devices 305, and/or any other suitable device).

Figure 6A:
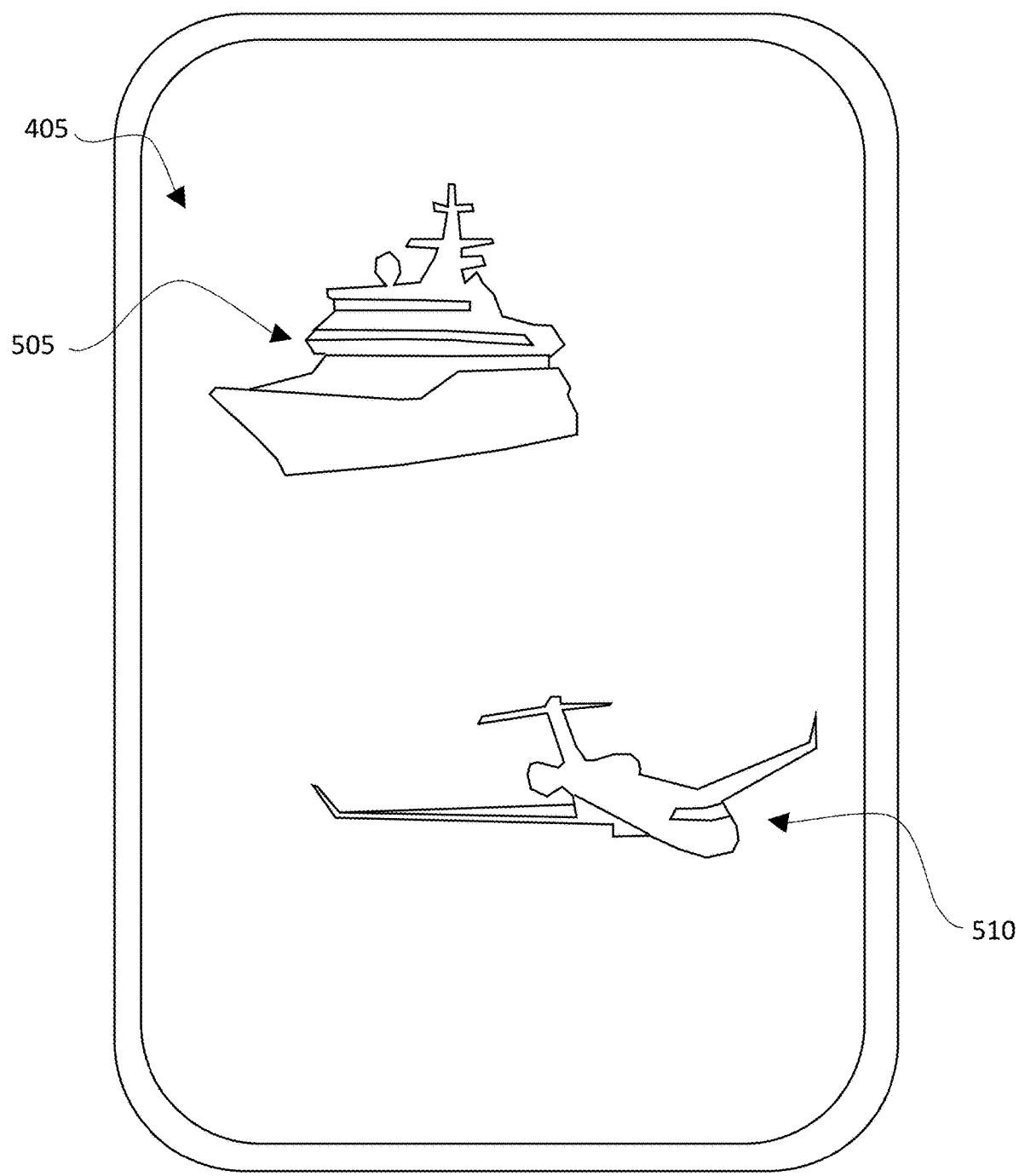
FIG. 6A is a schematic illustration of an exemplary embodiment of the exemplary disclosed system.

In at least some exemplary embodiments and as illustrated in FIG. 6A, system 300 may display virtual containers that may be graphical elements representing containers or vehicles (e.g., or any other suitable graphical element for illustrating a group of users) for illustrating the exemplary disclosed processes. The exemplary disclosed virtual container may involve any suitable theme for example as described below. For example, system 300 may display one or more yacht graphical elements 505. In a yacht example, the top tipping viewer (e.g., male user 320 or female user 325) may play the role of a ship's captain and a plurality of ordinary viewers may play the role of passengers and/or crew of the ship. Also for example, system 300 may display one or more jet graphical elements 510. In such a jet example, the top tipping viewer (e.g., male user 320 or female user 325) may play the role of a ship's captain and a plurality of ordinary viewers may play the role of passengers and/or crew of the jet. Any other suitable graphical elements such as, for example, a "virtual container" such as a tour bus, helicopter or other vehicles, umbrella or similar representation of a walking tour leader, military vehicles or structures, government symbols or structures, and/or any other suitable graphical element (e.g., representing any suitable theme and/or roles for users) may be used to illustrate a leader role and roles for a group of followers. For example, any suitable graphical representation serving as a "virtual container" for a leader (e.g., top tipping viewer) and followers (e.g., ordinary viewers) may be used. One or more top tipping viewers may serve in a leading role in any of the exemplary embodiments (e.g., one top tipping viewer may entirely lead, or a plurality of top tipping viewers may have varying leadership roles) of the exemplary disclosed system and method. For example, a yacht representation is used below as an illustrative example.

Figure 6B:
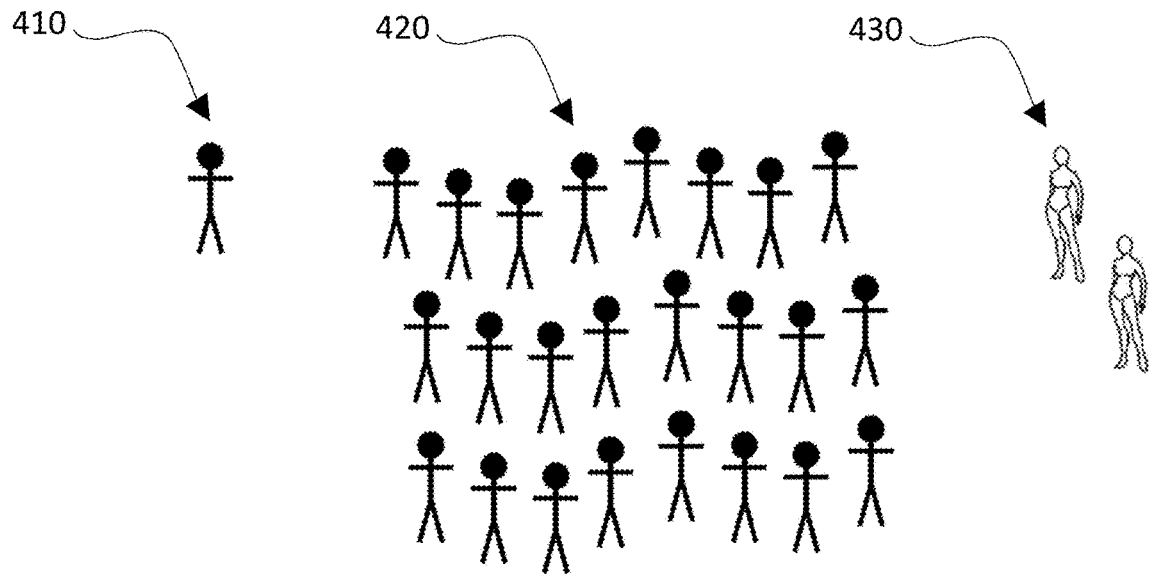
FIG. 6B is a schematic illustration of an exemplary embodiment of the exemplary disclosed system.
Figure 6C:
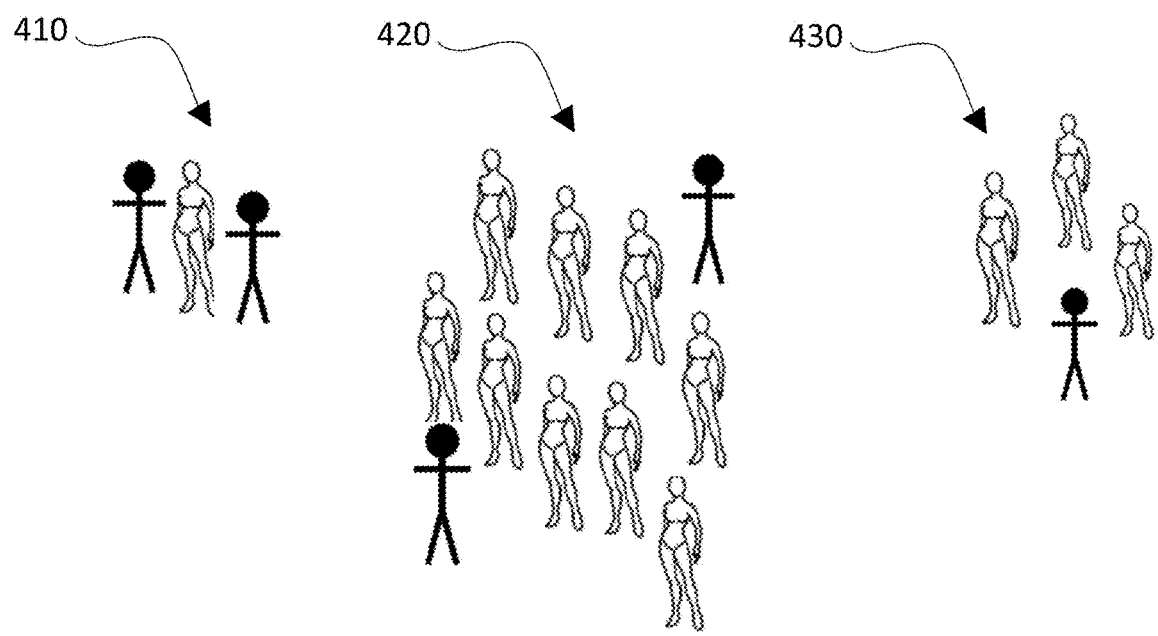
FIG. 6C is a schematic illustration of an exemplary embodiment of the exemplary disclosed system.

FIGS. 6B and 6C illustrate exemplary schematic illustrations showing exemplary groups of users including the exemplary disclosed top tipping viewers (e.g., top tipping viewers 410), the exemplary disclosed ordinary viewers (e.g., ordinary viewers 420), and the exemplary disclosed creators of online content such as models (e.g., models 430). For example as illustrated in FIG. 6B, a top tipping viewer 410 may lead many ordinary viewers 420 in viewing a plurality of models 430 (e.g., by visiting a plurality of model livestream broadcast rooms for example as described herein). Also for example as illustrated in FIG. 6C, a plurality of top tipping viewers 410 may lead many ordinary viewers 420 in viewing a plurality of models 430 (e.g., by visiting a plurality of model livestream broadcast rooms that may each include one or more models 430).

FIGS. 7A through 7F illustrate an exemplary embodiment of the exemplary disclosed system and method. System 300 may operate using an app (e.g., application and/or software plug-in such as a mobile device application and/or software plug-in) that may operate on the exemplary disclosed user device (e.g., male user device 305 or female user device 310) of one or more top tipping viewers, ordinary viewers, and/or models. Top tipping viewers, ordinary viewers, and/or models may be for example male users 320 and/or female users 325 for example as described above. For example as described herein, a top tipping viewer (e.g., top tipping viewer 410) may be a user (e.g., viewer) who provides a relatively large amount of tips (e.g., units of value such as tokens or currency that may be or that may be bought and used by users using national or regional currency or money, cryptocurrency, and/or any other units of value) to the exemplary disclosed model. An ordinary viewer (e.g., a low tipping viewer or a non-tipping viewer) such as ordinary viewer 420 may be a user (e.g., viewer) who provides a relatively little amount of tips or no tips to the exemplary disclosed model. A single or a few top tipping viewers may provide more tips to models using system 300 than total tips provided by a plurality of or many (e.g., a few or dozens or hundreds or more) ordinary viewers.

Figure 7A:
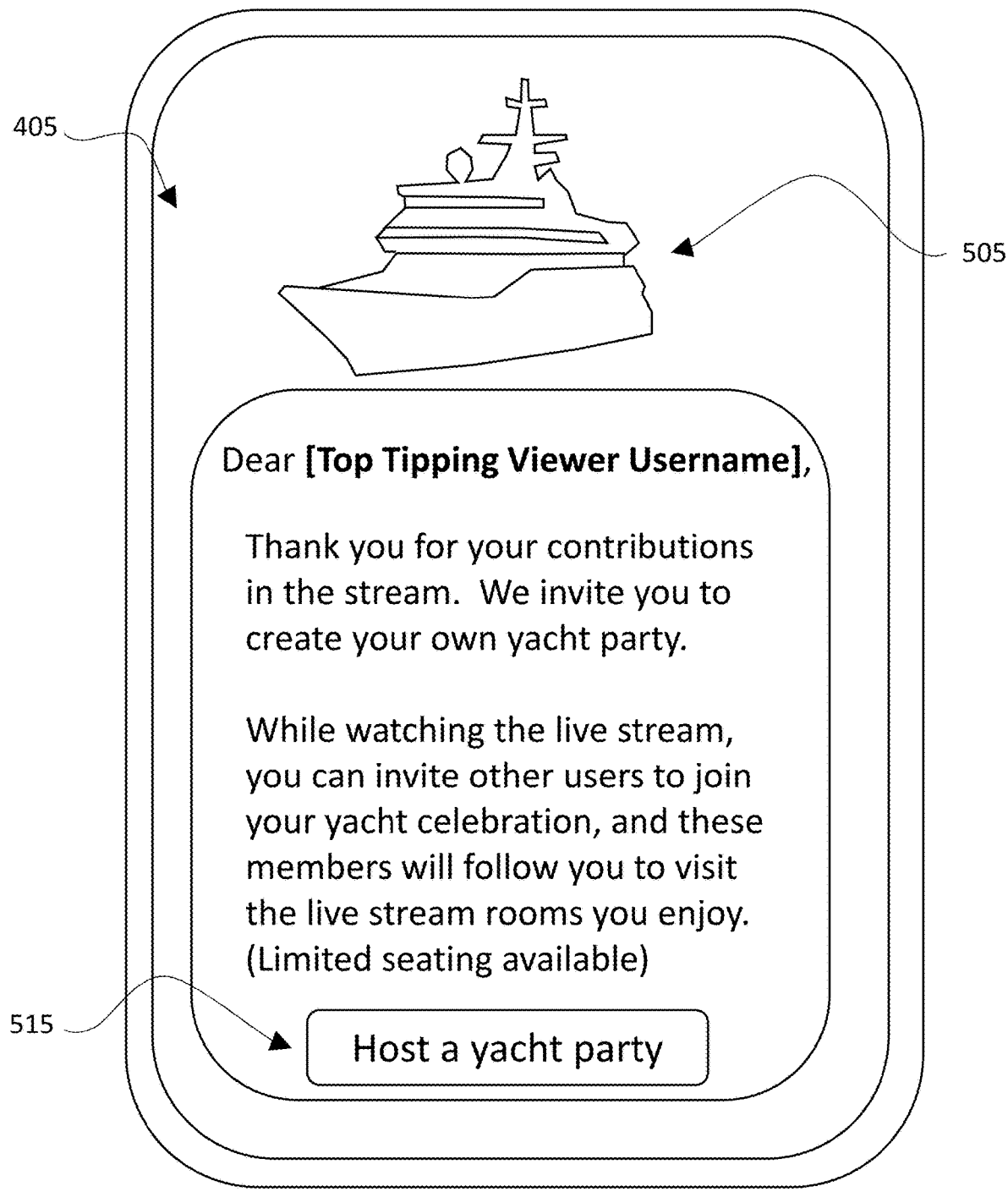
FIG. 7A is a schematic illustration of an exemplary embodiment of the exemplary disclosed system.

In at least some exemplary embodiments, a given top tipping viewer 410 may utilize system 300 to lead a group of ordinary viewers 420. FIG. 7A illustrates an exemplary embodiment of a top tipping viewer side of the exemplary disclosed application of system 300. As one illustrative embodiment, top tipping viewer 410 may "host a cruise party" or "create a cruise" (e.g., or use any other exemplary disclosed themes for example as described herein) that may provide any suitable "virtual container" for ordinary viewers 420 for example as described above. In the illustrative yacht example, top tipping viewer 410 may create a virtual container that may be a cruise container such as a "yacht party" or any other suitable virtual container. FIG. 7A illustrates a top tipping viewer side view of the exemplary disclosed app (e.g., module) displayed via GUI 405. Top tipping viewer 410 may activate (e.g., click on) a hosting graphical element 515 displayed by GUI 405, which may also display yacht graphical element 505 (e.g., or any other suitable graphical element graphically representing any suitable type of container). The virtual container (e.g., cruise container or any other exemplary disclosed container) may also be created by system 300 (e.g., via predetermined algorithms, artificial intelligence operations, input from operators and/or other users of system 300, a service provider of system 300, and/or any other suitable techniques) and configured to be managed by top tipping viewer 410 (e.g., and/or top tipping viewer 410 may create the virtual container via GUI 405). Top tipping viewer 410 may manage (e.g., including selecting) a target website (e.g., determine a first cruise target) to access. Top tipping viewer 410 may select any desired website to direct the virtual container to (e.g., and to be joined by ordinary viewers 420) for example as described below. The target website may be a livestream broadcast room of one or more models 430 (e.g., a single model 430 or a plurality of models 430). For example, the target website may be a livestream broadcast room of model 430 that may be a creator of online entertainment content (e.g., broadcasted pornographic performances) of that livestream broadcast room.

Figure 7B:
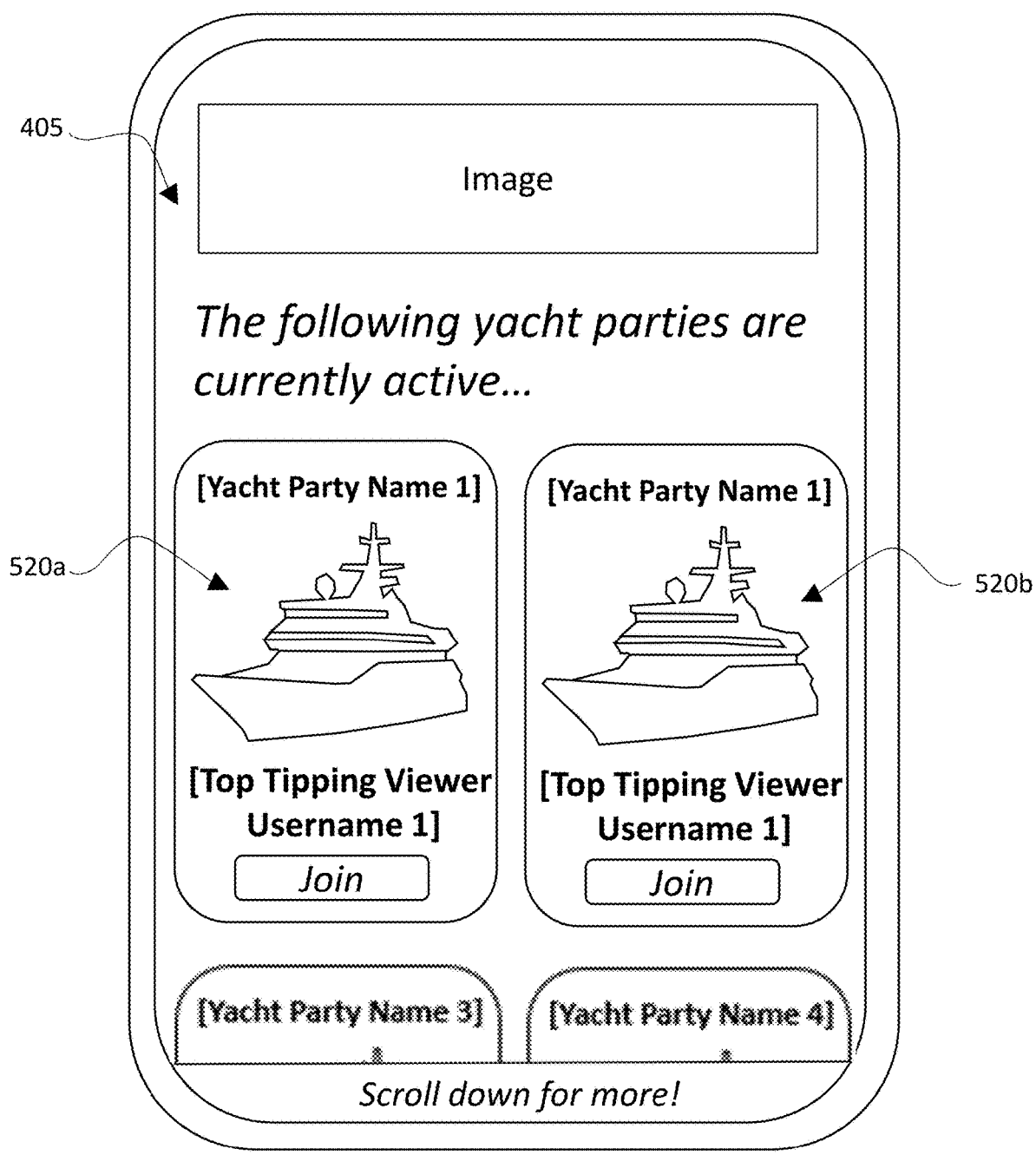
FIG. 7B is a schematic illustration of an exemplary embodiment of the exemplary disclosed system.

In at least some exemplary embodiments and as illustrated in FIG. 7B, a plurality of virtual containers such as cruise containers may be displayed by system 300 via GUI 405. FIG. 7B (e.g., and FIGS. 7C and 7D described below) illustrates an ordinary viewer side view of the exemplary disclosed app (e.g., module) displayed via GUI 405. After the virtual container (e.g., cruise container or any other exemplary disclosed container) is created by system 300 and/or top tipping viewer 410 for example as described above regarding FIG. 7A, the created virtual container may be displayed to ordinary viewers 420 (e.g., on a designated page provided by GUI 405), for example along with other virtual containers (e.g., a plurality of other virtual containers) created by other top tipping viewers 410 of system 300. For example, a first container 520a (e.g., created as described above), a second container 520b (e.g., similarly created as described above by another top tipping viewer 410), and/or additional virtual containers may be displayed to ordinary viewers 420. Ordinary viewer 420 may for example scroll through a plurality of virtual containers using GUI 405 to select a desired virtual container. In at least some exemplary embodiments, ordinary viewer 420 may select a virtual container created by a user (e.g., top tipping viewer 410) whom for example ordinary viewer 420 knows of from previous use of system 300. Ordinary viewer 420 may also select a virtual container based on information regarding the managing user (e.g., a given top tipping viewer 410) provided by system 300, random selection by ordinary viewer 420, an invitation provided by a given top tipping viewer 410, suggestions and/or selections of system 300 (e.g., predetermined algorithms, artificial intelligence operations, and/or any other suitable technique) and/or any other suitable criteria.

Figure 7C:
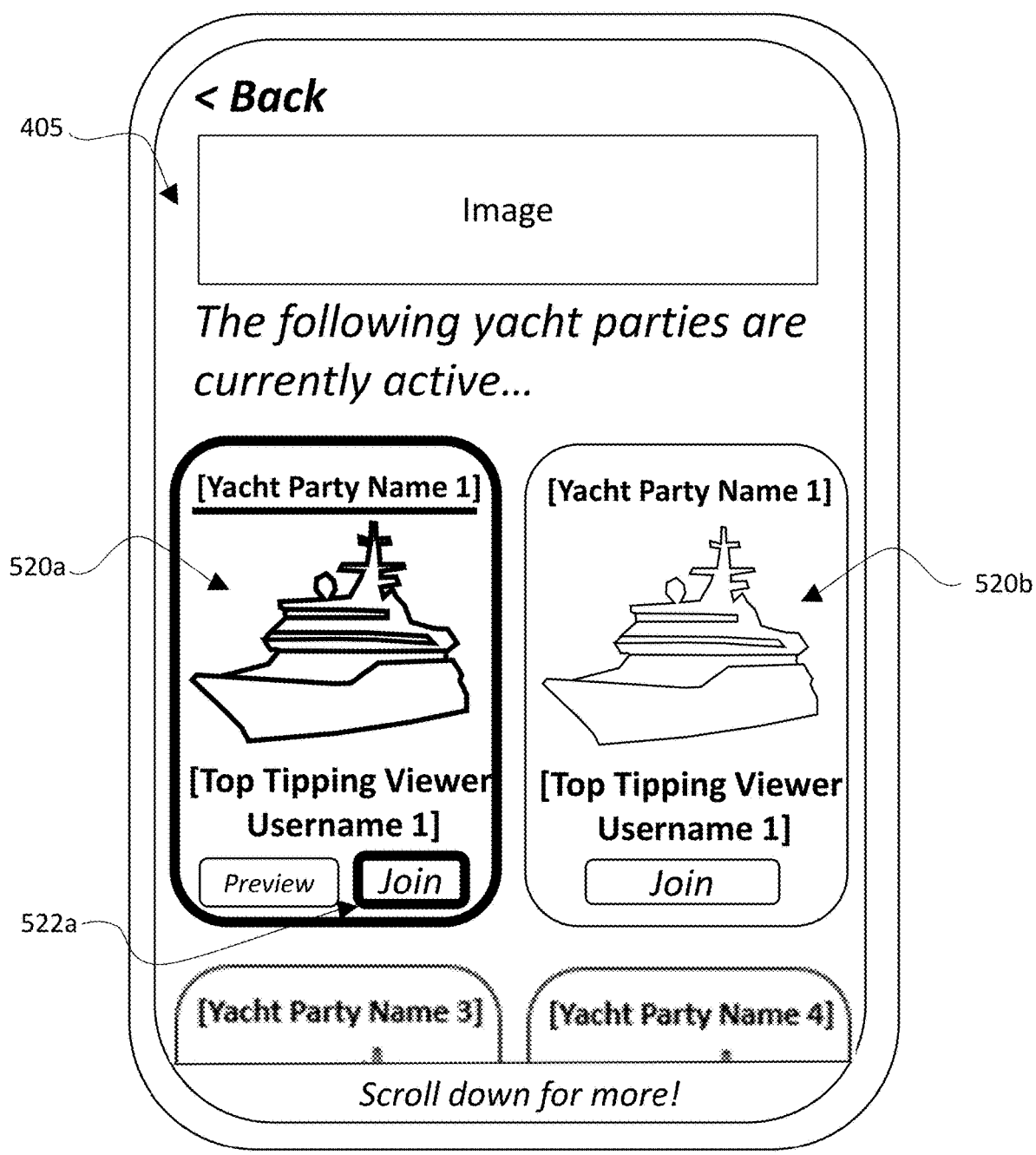
FIG. 7C is a schematic illustration of an exemplary embodiment of the exemplary disclosed system.
Figure 7D:
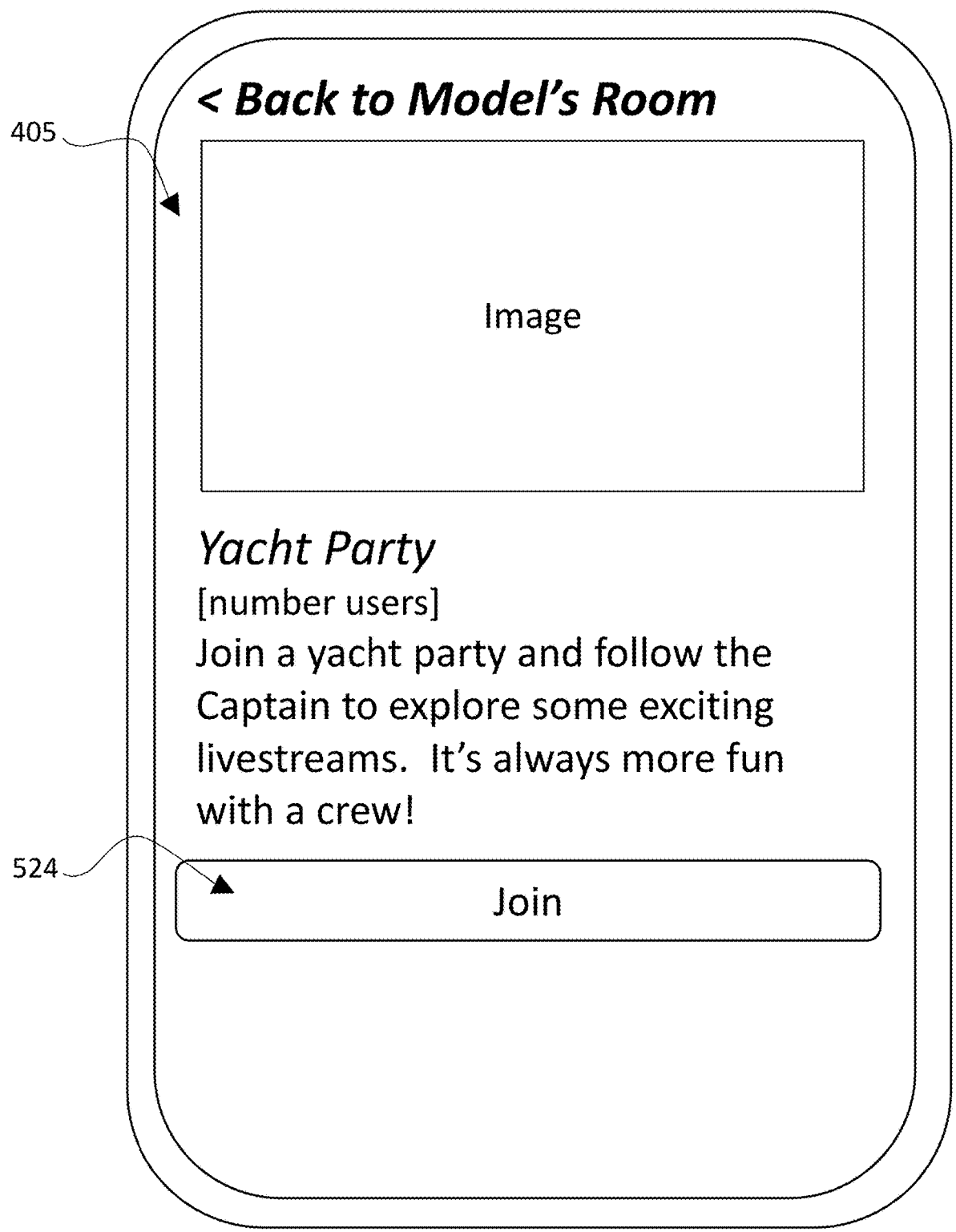
FIG. 7D is a schematic illustration of an exemplary embodiment of the exemplary disclosed system.

In at least some exemplary embodiments and as illustrated in FIG. 7C, ordinary viewer 420 may join a given virtual container (e.g., first container 520a). For example, ordinary viewer 420 may activate (e.g., click on and/or hover over) a joining graphical element 522a. Based on ordinary viewer 420 activating joining graphical element 522a, system 300 may display a joining page via GUI 405 for example as illustrated in FIG. 7D. The joining page may include a join-now graphical element 524. Ordinary viewer 420 may activate (e.g., click on) join-now graphical element 524, which may add ordinary viewer 420 to the virtual container such as a yacht container (e.g., first container 520a). Any suitable number of different ordinary viewers 420 may join any given virtual container using GUI 405 for example as described above. For example, ordinary viewers 420 may choose to join a virtual container such as a cruise container by using a predefined operation associated with the cruise container (e.g., clicking a "join" button such as join-now graphical element 524 to join, applying to join the cruise container with the creating top tipping viewer approving joining, and/or any other suitable operation). After a given exemplary disclosed ordinary viewer joins (e.g., or is approved to join) a given virtual container (e.g., cruise container or any other exemplary disclosed container), that ordinary viewer may automatically (e.g., or optionally for example based on the discretion of a user of system 300) bind to the joined container (e.g., to view the same content as a given top tipping viewer for example as described herein).

Figure 7E:
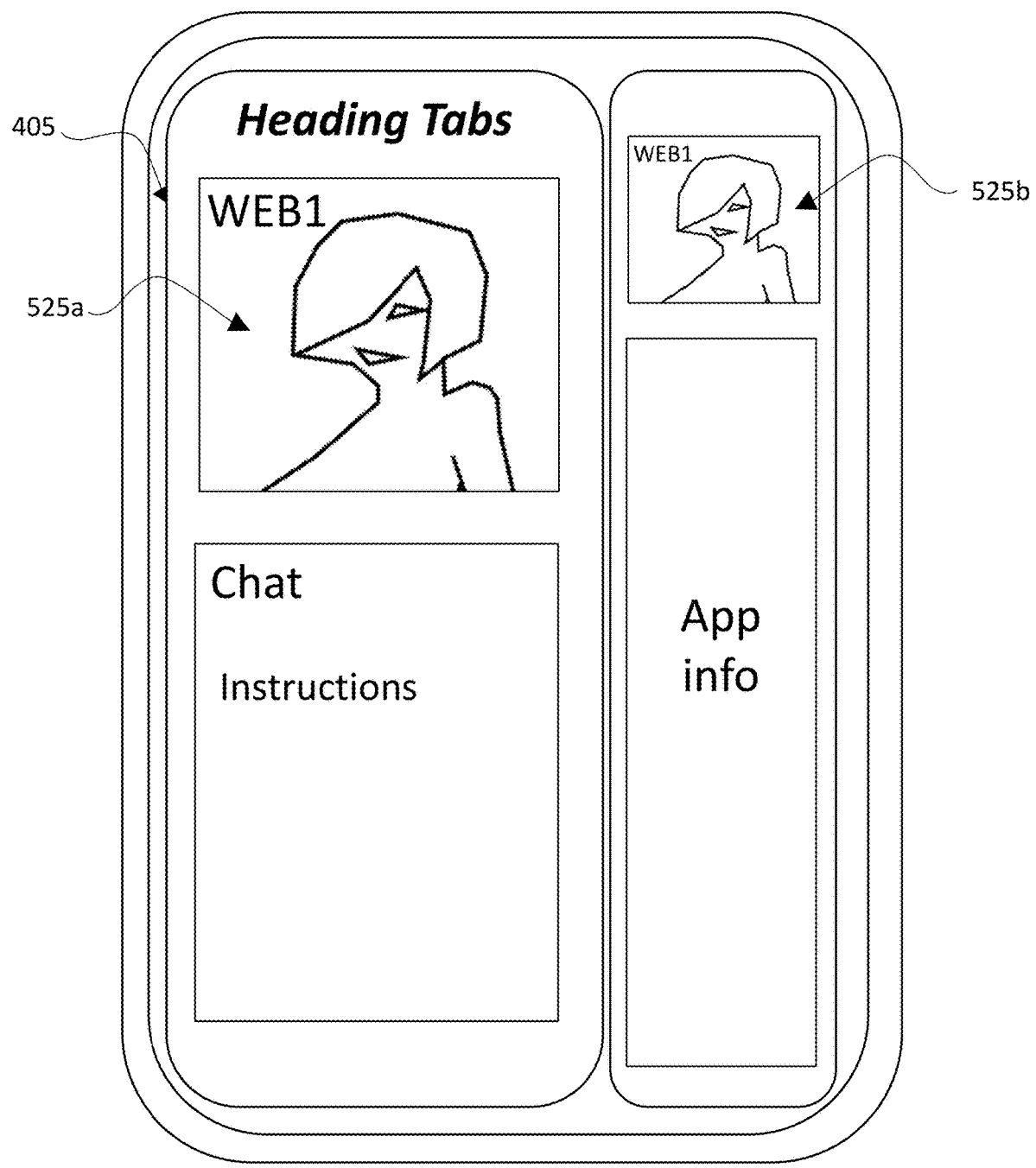
FIG. 7E is a schematic illustration of an exemplary embodiment of the exemplary disclosed system.
Figure 7F:
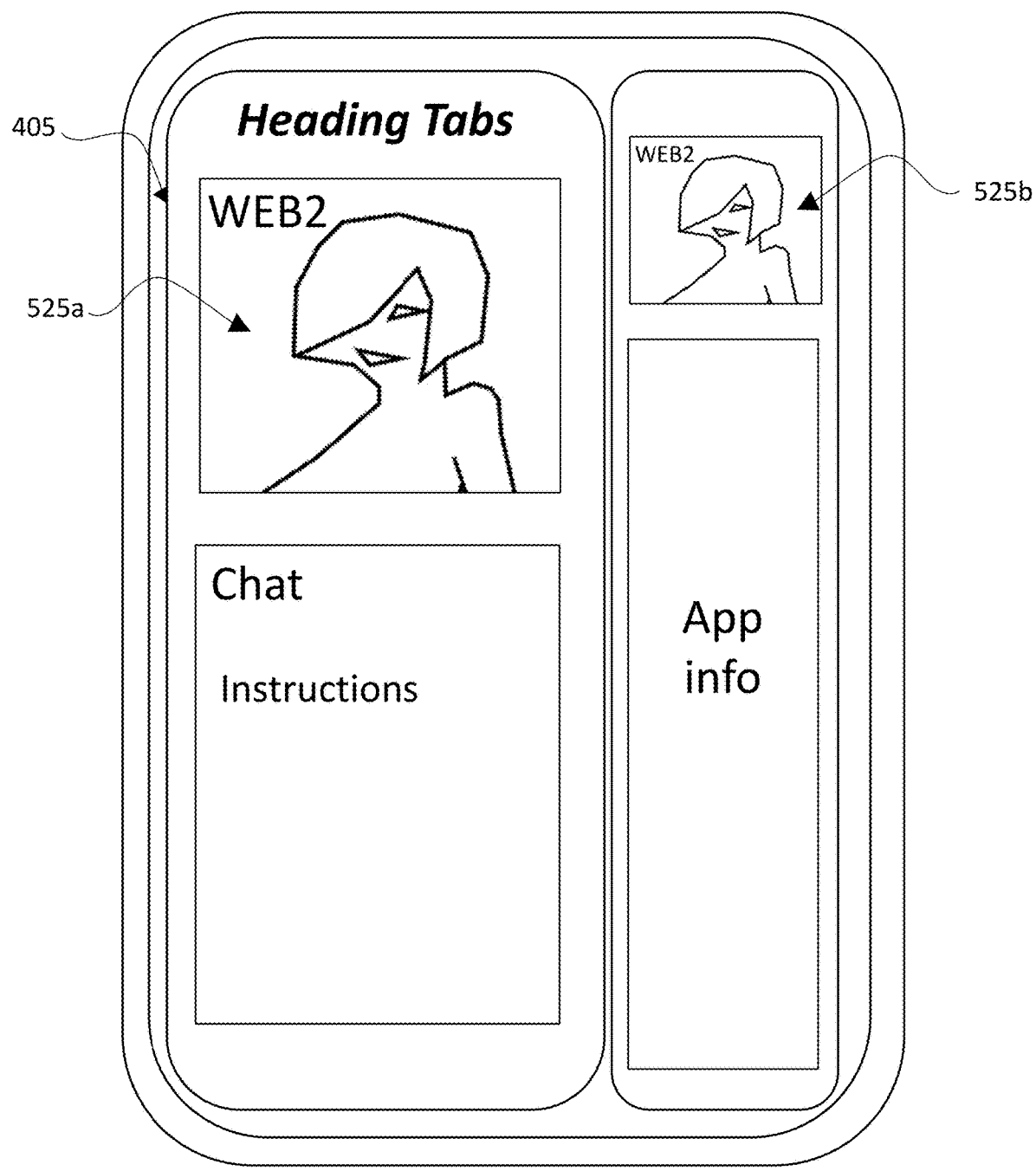
FIG. 7F is a schematic illustration of an exemplary embodiment of the exemplary disclosed system.

In at least some exemplary embodiments and as illustrated in FIGS. 7E and 7F, by binding to a given virtual container (e.g., first container 520a), a given ordinary viewer 420 may bind to the same target website as a given top tipping viewer 410 who created that container (e.g., first container 520a). FIGS. 7E and 7F illustrate a top tipping viewer side view of the exemplary disclosed app (e.g., module) displayed via GUI 405 (e.g., to top tipping viewer 410). Some or substantially all of GUI 405 illustrated in FIGS. 7E and 7F may also be similarly displayed on an ordinary viewer side view (e.g. to ordinary viewer 420). System 300 may display a target graphical element 525a and a target graphical element 525b to top tipping viewer 410 (e.g., and/or ordinary viewers 420) via GUI 405. Target graphical elements 525a and 525b may display a website being viewed by top tipping viewer 410 and ordinary viewers 420. In at least some exemplary embodiments, target graphical element 525a may display a website being viewed by top tipping viewer 410, and target graphical element 525b may display a website being viewed by one or more ordinary viewers 420 (e.g., a plurality of ordinary viewers 420). In at least some exemplary embodiments, target graphical element 525b may display a website being viewed by top tipping viewer 410, and target graphical element 525a may display a website being viewed by one or more ordinary viewers 420 (e.g., a plurality of ordinary viewers 420). Target graphical elements 525a and 525b may display a same website (e.g., a same website as each other)

for example as described below. For example, when ordinary viewers 420 join a virtual container of a given top tipping viewer 410 for example as described above, those ordinary viewers 420 may bind to that top tipping viewer 410 and may accordingly view a same website as that top tipping viewer 410. That is, for example, when top tipping viewer 410 uses system 300 (e.g., GUI 405) to select and view a given website, ordinary viewers 420 in the virtual container (e.g., first container 520*a* or second container 520*b*) created by top tipping viewer 410 may view the same website as top tipping viewer 410 at the same time (e.g., contemporaneously in real-time or near real-time).

As illustrated in FIGS. 7E and 7F, ordinary viewers 420 who have joined and thereby bind to a given top tipping viewer 410 may view the same websites as the given top tipping viewer 410 in real-time or near real-time as that top tipping viewer 410 views websites (e.g., surfs content). That is, for example, top tipping viewer 410 may lead the virtual container including the bound ordinary viewers 420 through website content, with the bound ordinary viewers 420 experiencing the same content as the leading top tipping viewer in real-time or near real-time (e.g., so that ordinary viewers 420 bind contemporaneously to the same websites as top tipping viewer 410). The websites may include the exemplary disclosed livestream broadcast room (e.g., of a given model 430). For example as illustrated in FIG. 7E, when top tipping viewer 410 accesses a first target website WEB1 based on using GUI 405, bound ordinary viewers 420 may also access via the exemplary disclosed second terminals (e.g., automatically access without manipulation of GUI 405) first target website WEB1. Also for example as illustrated in FIG. 7F, when top tipping viewer 410 accesses a second target website WEB2 based on using GUI 405, bound ordinary viewers 420 may also access (e.g., automatically access without manipulation of GUI 405) second target website WEB2 via the second terminals. Top tipping viewer 410 and bound ordinary viewers 420 may access (e.g., via the exemplary disclosed respective first and second terminals) any desired number of websites, with top tipping viewer 410 leading bound ordinary viewers 420 of the virtual container of top tipping viewer 410 contemporaneously through any desired website content (e.g., any desired number of successive websites). For example, ordinary viewers 420 may follow and watch (e.g., follow and jump with) top tipping viewer 410 through different, successive websites. Ordinary viewers 420 may thereby experience websites contemporaneously with top tipping viewer 410, which may increase interaction and thereby entertainment for ordinary viewers 420. For example, top tipping viewer 410 may lead ordinary viewers 420 to various websites that may be livestream broadcast rooms of various models 430, with ordinary viewers 420 experiencing increased interaction in those livestream broadcast rooms based on top tipping viewer 410 tipping and interacting with models 430. In addition to experiencing increased entertainment, ordinary viewers 420 may be encouraged to emulate top tipping viewer 410, thereby contributing to interaction in a given website (e.g., livestream broadcast room) and/or providing increased tipping to models 430.

In at least some exemplary embodiments, system 300 may control the exemplary disclosed second terminal to access a first cruise target according to the exemplary disclosed resources (e.g., associated resources). System 300 may prompt an interface display (e.g., GUI 405) of the second terminal that may display the same online entertainment content as at least a part of the interface (e.g., GUI 405) of the exemplary disclosed first terminal. System 300 may control the second terminal to access the first cruise target according to the associated resources, and may prompt the interface display of the second terminal to display the same online entertainment content as at least a part of the interface of the first terminal through a preconfigured rendering window or browser tab displayed via the second terminal.

In at least some exemplary embodiments, system 300 may include the exemplary disclosed first terminal, second terminal, the exemplary disclosed modules (e.g., application such as a fan or viewer application for viewing content such as livestream broadcast room content), and/or a service provider (e.g., platform) for providing the exemplary disclosed application to viewers. System 300 may provide (e.g., form) the exemplary disclosed virtual containers (e.g., one or more cruise containers). The virtual containers (e.g., cruise containers or any other exemplary disclosed container) may be configured as a cruise target managed by at least one of the exemplary disclosed first terminal (e.g., of top tipping viewer 410) or the exemplary disclosed service provider (e.g., platform). The cruise target may include a target website (e.g., first target website WEB1 or second target website WEB2) for browsing online entertainment content (e.g., livestream broadcast rooms of models 430). System 300 may prompt a virtual user identity of a second terminal (e.g., a virtual user identity including any suitable data or information associated with one or more ordinary viewers 420) to join the cruise container in response to an interactive operation of the second terminal on the cruise container (e.g., including joining the container). System 300 may configure the second terminal (e.g., of one or more ordinary viewers 420) to bind to the same cruise target as the first terminal (e.g., of top tipping viewer 410) based on the virtual identity of the user (e.g., ordinary viewer 420) of the second terminal. In response to determining a first cruise target via the first terminal (e.g., the first terminal accesses target website WEB1), system 300 may send resources (e.g., data) associated with the first cruise target to the second terminal. System 300 may also control the second terminal to access the first cruise target according to the associated resources, and prompt the interface display of the second terminal to display content that is the same online entertainment content as at least a part of the interface of the first terminal. System 300 may similarly determine subsequent cruise targets (e.g., second target website WEB2).

Figure 8A:
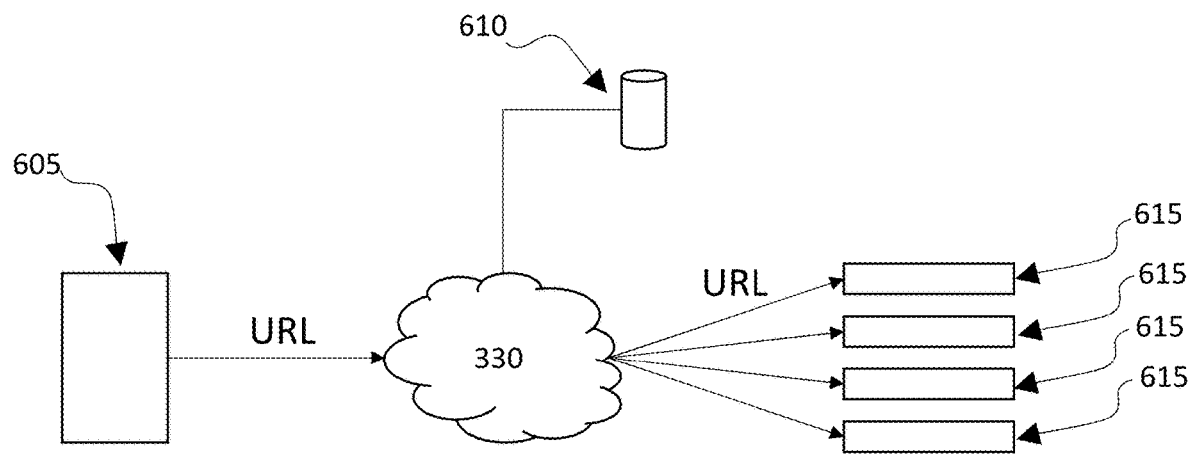
FIG. 8A is a schematic illustration of an exemplary embodiment of the exemplary disclosed system.

In at least some exemplary embodiments and as illustrated in FIG. 8A, the exemplary disclosed resources associated with the first cruise target (e.g., first target website WEB1) may be a URL (Uniform Resource Locator) of the cruise target website. When a browser (e.g., including target graphical elements 525*a* and/or 525*b*) of a first terminal 605 (e.g., of top tipping viewer 410) switches to a new webpage, system 300 may detect a URL change and send the new URL to a server 610 (e.g., directly or via network 330). Server 610 may be similar to the exemplary disclosed server described below regarding FIGS. 13 and 14. After server 610 receives the URL of first terminal 605, server 610 may forward the URL to one or more second terminals 615 (e.g., a plurality of second terminals 615) for example of one or more ordinary viewers 420. After second terminal 615 receives the URL, second terminal 615 may control the browser (e.g., including target graphical elements 525*a* and/or 525*b*) of second terminal 615 to automatically jump to and access the webpage corresponding to the URL (e.g., a livestream broadcast room of model 430 being viewed by top tipping viewer 410). The exemplary disclosed target (e.g., first cruise target) may be determined using any suitable technique. For example, when the first terminal opens multiple browser windows through the browser (e.g., via GUI 405), system 300 may identify (e.g., locate) the browser window currently being viewed by the first terminal. Also for example, when the first terminal views multiple browser windows simultaneously (e.g., via GUI 405), system 300 may identify (e.g., locate) a current front window of the browser (e.g., window being display at the front of or on top of a display of GUI 405) as the target (e.g., first cruise target or any other subsequent cruise targets during an operation of system 300).

In at least some exemplary embodiments, in response to determining a first cruise target by the exemplary disclosed first terminal, system 300 may send resources associated with the first cruise target to the exemplary disclosed second terminal. Sending the resources may include detecting a URL (Uniform Resource Locator) of the cruise target accessed by the first terminal. When the URL of the cruise target meets predetermined conditions, system 300 may confirm that the current cruise target is the first cruise target (e.g., target website WEB1 or WEB2), and may obtain the URL of the first cruise target. System 300 may send the associated resources containing the URL of the first cruise target to the second terminal.

Figure 8B:
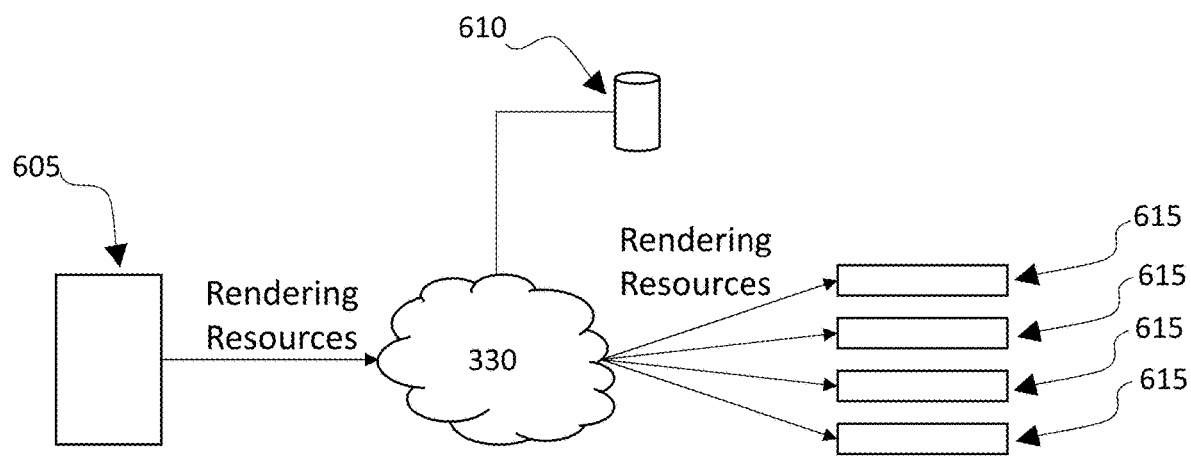
FIG. 8B is a schematic illustration of an exemplary embodiment of the exemplary disclosed system.

In at least some exemplary embodiments and as illustrated in FIG. 8B, the exemplary disclosed resources associated with the first cruise target (e.g., first target website WEB1) may be rendering resources of the target website. The rendering resources of the target website may be resources of the live video window (e.g., of the livestream broadcast for example of model 430), image resources, and/or any other suitable resources. For example, the rendering resources of a webpage (e.g., JavaScript execution, CSS loading, image loading, and/or any other suitable webpage rendering resources) in the browser (e.g., including target graphical elements 525a and/or 525b) of first terminal 605 (e.g., of top tipping viewer 410) may be monitored. Rendering resources such as a rendering status and content of the page may be captured, and rendering resources such as the page rendering status of first terminal 605 (e.g., HTML structure, CSS style, JavaScript execution result, and/or any other suitable data) may be transmitted to one or more second terminals 615. The browser (e.g., including target graphical elements 525a and/or 525b) of second terminal 615 may be controlled to directly build and render the same page content (e.g., of first terminal 605) in memory. In at least some exemplary embodiments, system 300 utilizes the exemplary disclosed rendering resources to directly synchronize the rendering results of the page without the URL (e.g., the URL is not used in this exemplary case).

In at least some exemplary embodiments, in response to determining a first cruise target by the exemplary disclosed first terminal, system 300 may send resources associated with the first cruise target to the exemplary disclosed second terminal. In response to determining the first cruise target by the first terminal, system 300 may obtain rendering resources of the target website corresponding to the first cruise target, and may send the rendering resources of the target website to the second terminal.

In at least some exemplary embodiments, system 300 may operate to configure interactive data. In response to determining a first cruise target (e.g., first target website WEB1) by the exemplary disclosed first terminal, system 300 may configure interactive data for the exemplary disclosed terminals (e.g., to at least one of the first terminal, the second terminal, and/or management terminal of the exemplary disclosed platform, service provider, or model 430) of the online entertainment content (e.g., livestream broadcast of model 430). System 300 may configure the interactive data (e.g., as further described below) to interact with the online entertainment content (e.g., of target websites WEB1 and/or WEB2).

In at least some exemplary embodiments, the exemplary disclosed interactive data may include a rewards tip or tips to the creator of the online entertainment content (e.g., model 430). For example, when the virtual container (e.g., cruise or any other exemplary disclosed container) enters the model's live broadcast room (e.g., when the first cruise target is determined by the first terminal), system 300 may trigger a tip (e.g., or a prompt via the second terminal for ordinary viewer 420 to provide a tip) to be provided to the creator (e.g., model 430). For example, after a predetermined (e.g., preset) time period has elapsed since the virtual container has entered a model's livestream broadcast room, system 300 may trigger model 430 to be automatically tipped (e.g., or a prompt may be provided via the second terminal for ordinary viewer 420 to provide a tip). Also for example, system 300 may automatically trigger a tip (e.g., of a minimum amount such as 10 tokens or any other suitable amount) when the virtual container arrives in the model's livestream broadcast room.

Figure 9:
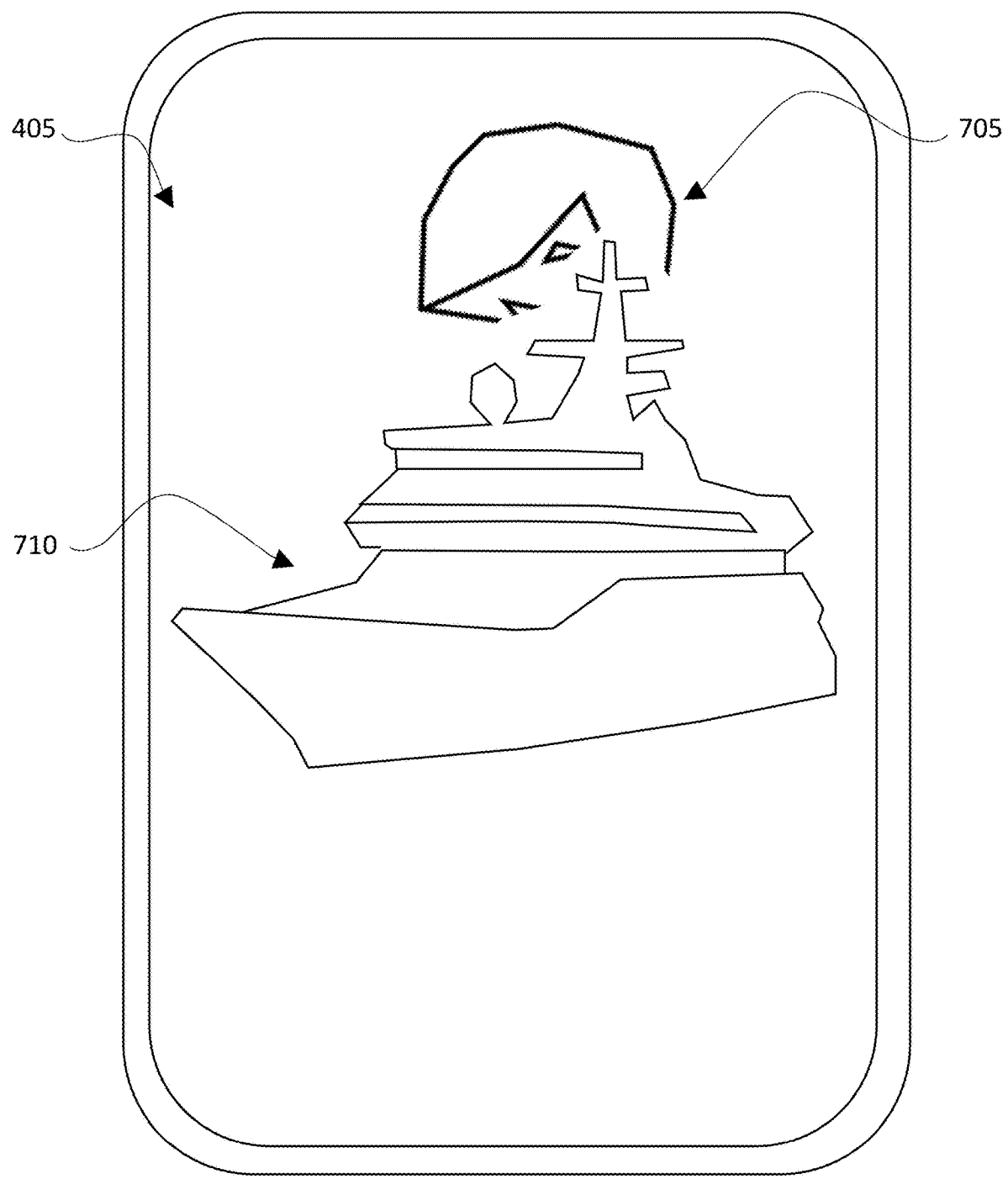
FIG. 9 is a schematic illustration of an exemplary embodiment of the exemplary disclosed system.

In at least some exemplary embodiments and as illustrated in FIG. 9, the exemplary disclosed interactive data may include special effects that may be rendered by system 300 in or near the display of the exemplary disclosed online entertainment content. For example when the virtual container (e.g., cruise or any other exemplary disclosed container) enters a model's live broadcast room (e.g., target websites WEB1 or WEB2), system 300 may trigger rendering of special effects. For example, an animated graphical element 710 (e.g., an animation effect of a 3D cruise entering GUI 405) may be displayed in or near in the display of online entertainment content 705 (e.g., livestream broadcast of model 430 for example of target websites WEB1 or WEB2).

In at least some exemplary embodiments, the exemplary disclosed interactive data may include control permission (e.g., synchronous control permission) of one or more adult toys (e.g., female accessories 315 and/or male accessories 308) of the creator of the livestream broadcast (e.g., model 430). For example when the virtual container (e.g., cruise or any other exemplary disclosed container) enters a model's live broadcast room, system 300 may trigger a benefit (e.g., a specific benefit) that provides one or more of the members of the virtual container such as a cruise (e.g., top tipping viewer 410 via the first terminal or ordinary viewer 420 via the second terminal) permission to control the model's adult toy. Also for example when the virtual container (e.g., cruise or any other exemplary disclosed container) enters a model's live broadcast room, system 300 may trigger a benefit (e.g., a specific benefit) that provides an adult toy of one or more of the members of the virtual container such as a cruise (e.g., top tipping viewer 410 via the first terminal or ordinary viewer 420 via the second terminal) to be controlled based on providing permission to model 430. Further for example when the virtual container (e.g., cruise or any other exemplary disclosed container) enters a model's live broadcast room, system 300 may trigger a benefit (e.g., a specific benefit) that provides one or more of the members of the virtual container such as a cruise (e.g., top tipping viewer 410 via the first terminal or ordinary viewer 420 via the second terminal) permission to control an adult toy of one or more other members of the cruise (e.g., in synchronization with the model's adult toy).

In at least some exemplary embodiments, the exemplary disclosed interactive data may be associated with the characteristic data of the exemplary disclosed virtual container (e.g., the cruise container). For example, the visual effect of the exemplary disclosed special effect may be related to a level (e.g., a participation level) of the cruise container. For example, when the participation level of the cruise container is higher (e.g., as the number of ordinary viewers 420 who have joined increases), an animation effect of a 3D cruise graphical element may be greater (e.g., of longer duration, greater intensity, and/or more intricate and/or sophisticated animation). Also for example, the visual effect of the exemplary disclosed special effect may be related to an interaction level of the cruise container that may include a level of tipping, comment data, and/or any other suitable interaction data between model 430 and viewers (e.g., top tipping viewer 410 and ordinary viewers 420). For example, a level of the cruise container may be related to a number of cruise members (e.g., including number of ordinary viewers 420) and/or interaction data between model 430 and the cruise members.

In at least some exemplary embodiments, the exemplary disclosed interactive data may be generated based on a content interactive operation between the exemplary disclosed first terminal and the online entertainment content (e.g., target websites WEB1 or WEB2), which may then be provided by system 300 to the exemplary disclosed second terminal. For example, benefits provided by system 300 may be increased and/or shared between viewers in the virtual container. As an illustrative example, without the use of virtual containers, viewers providing model 430 with a tip of 100 tokens may receive five minutes of control over the model toy. However in this illustrative example, if a member of the cruise (e.g., one or more top tipping viewers 410) tip the model 100 tokens, the tipper may receive an additional one minute of control (e.g., or any other suitable duration) over the model toy, and/or may share one minute of control over the model toy with other cruise members (e.g., ordinary viewers 420 using the exemplary disclosed second terminals).

In at least some exemplary embodiments, in response to determining a first cruise target by the exemplary disclosed first terminal, system 300 may configure interactive data associated with at least one of the first terminal, the exemplary disclosed second terminal, or a management terminal of the online entertainment content (e.g., the exemplary disclosed terminal of model 430). System 300 may configure the interactive data to interact with online entertainment content (e.g., livestream broadcast data). The interactive data may include a rewards tip (e.g., exemplary disclosed tips) to the creator of the online entertainment content (e.g., model 430). The interactive data may include rendering special effects in the display of the online entertainment content (e.g., of GUI 405 for example as described herein). The interactive data may include control permission and/or synchronous control permission of adult toys of the creator of the online entertainment content (e.g., model 430).

Figure 10:
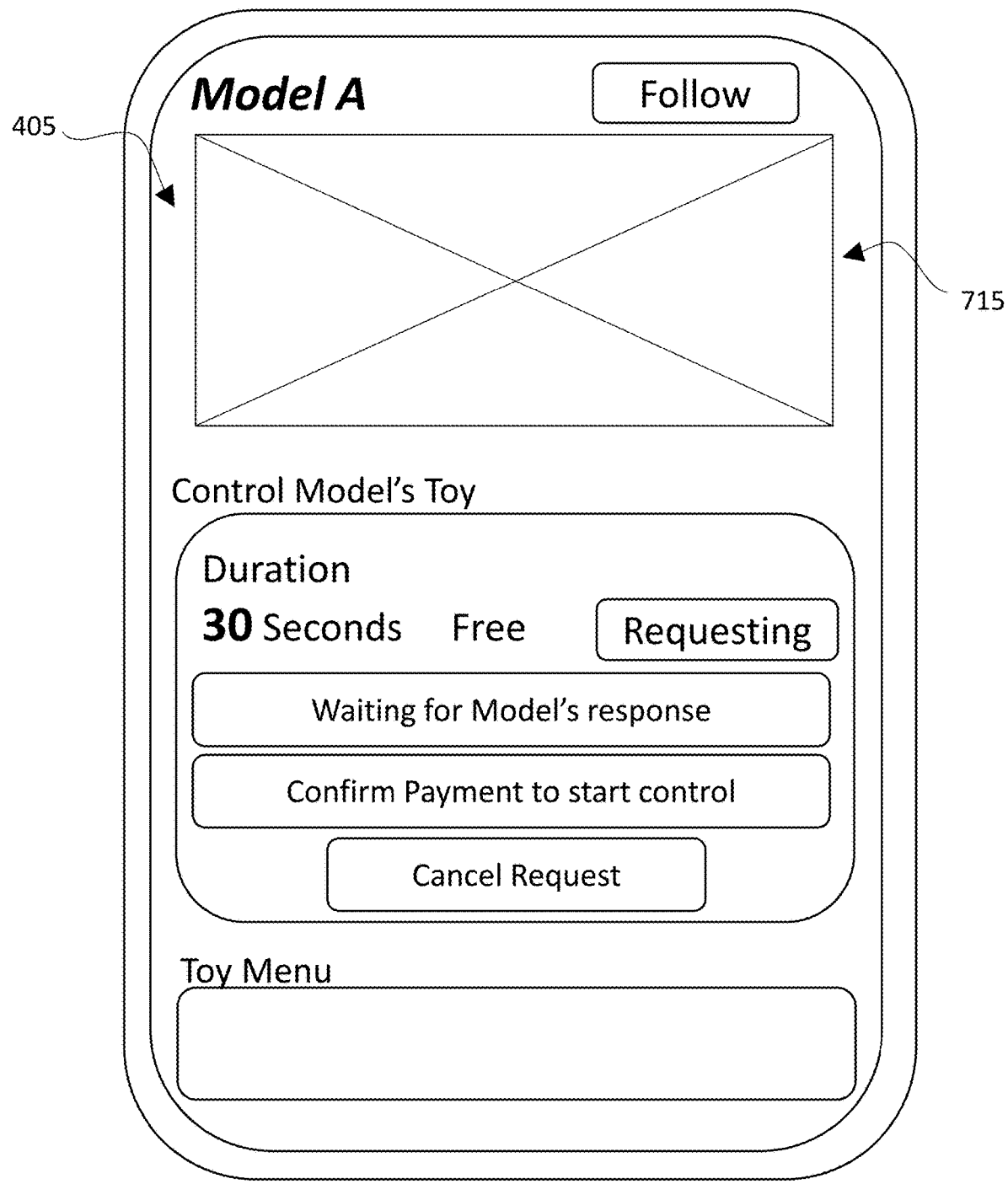
FIG. 10 is a schematic illustration of an exemplary embodiment of the exemplary disclosed system.

In at least some exemplary embodiments and as illustrated in FIG. 10, system 300 may display the same online entertainment content (e.g., of target websites WEB1 and WEB2) between the exemplary disclosed first terminal and second terminal. For example, FIG. 10 illustrates an exemplary ordinary viewer side view of the exemplary disclosed application. For example after sending resources associated with a first cruise target (e.g., first target website WEB1) to the exemplary disclosed second terminal, system 300 may control the second terminal to access the first cruise target according to the associated resources by a preconfigured rendering window 715 as illustrated in FIG. 10 and/or a browser tab of the second terminal. System 300 may thereby prompt GUI 405 (e.g., interface display) of the second terminal to display the same online entertainment content as at least a part of GUI 405 of the first terminal (e.g., as illustrated in FIGS. 7E and 7F). As illustrated in FIG. 10, the second terminal may display less than an entire page of a website accessed by the first terminal. For example, the second terminal may display specific sexual entertainment related content (e.g., a live video window showing the exemplary disclosed livestream broadcast of model 430), while omitting other elements of an original website (e.g., other portions of target website WEB1 or WEB2) accessed by the first terminal.

Figure 11:
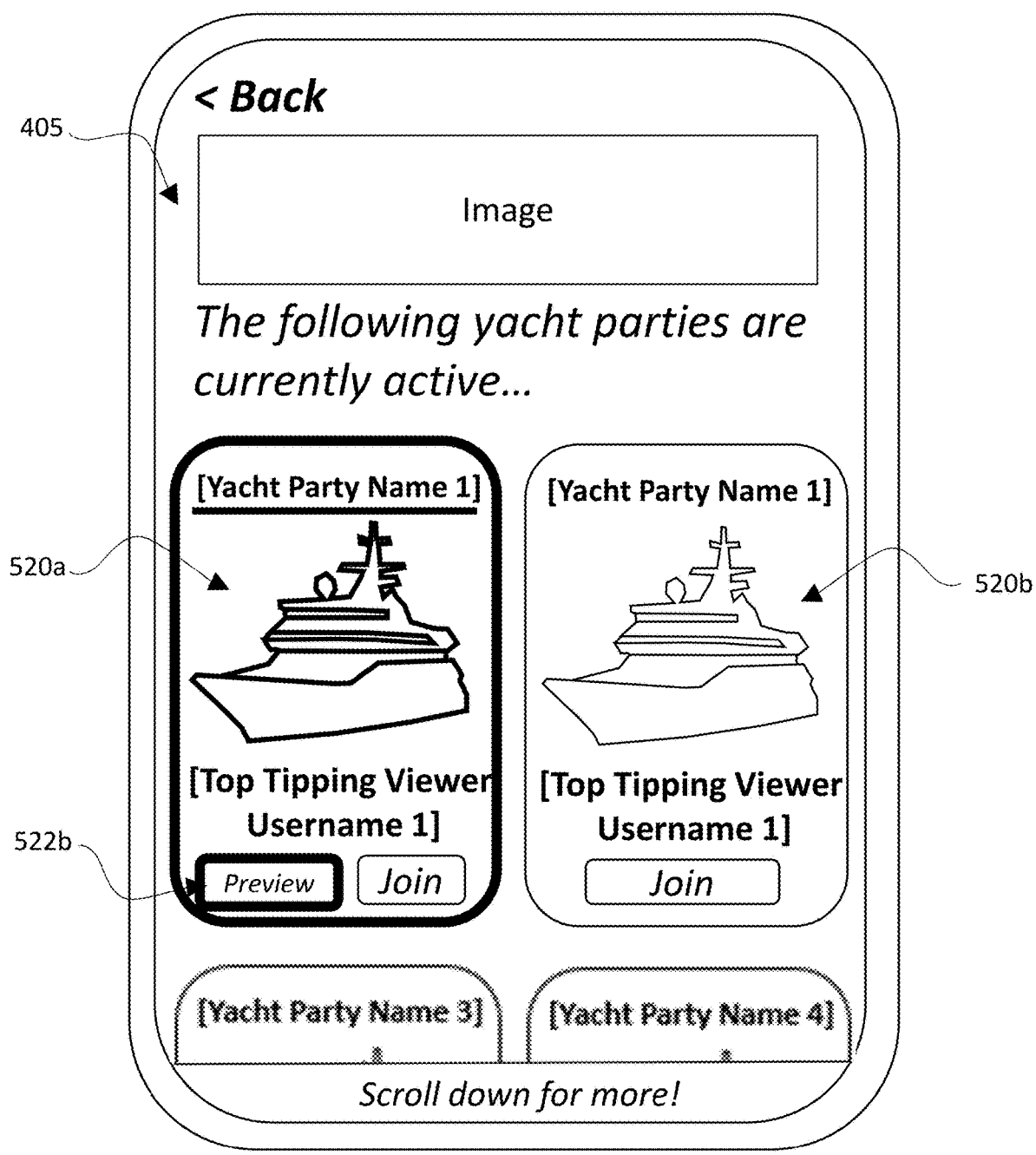
FIG. 11 is a schematic illustration of an exemplary embodiment of the exemplary disclosed system.

In at least some exemplary embodiments and as illustrated in FIG. 11, system 300 may operate to bind second terminals of ordinary viewers 420 to the same cruise target and/or other operations of first terminals of top tipping viewer 410. Before ordinary viewers 420 join a virtual container such as a cruise container, they may preview which cruise targets (e.g., target websites WEB1 and/or WEB2) top tipping viewer 410 may be accessing. For example as illustrated in FIG. 11, ordinary viewer 420 may activate (e.g., click on or hover over) a preview graphical element 522b, which may cause GUI 405 to display a website preview page, a preview pop-up displaying website information, and/or perform any other suitable action for providing preview information. If a webpage (e.g., target website WEB1 or WEB2) being accessed (e.g., currently accessed and/or scheduled to be accessed) by top tipping viewer 410 interests ordinary viewer 420, then ordinary viewer 420 may join the virtual container (e.g., first container 520a or second container 520b) being hosted by top tipping viewer 410. After ordinary viewers 420 join a given cruise container, the exemplary disclosed second terminals of ordinary viewers 420 may be automatically bound by system 300 or may optionally bind (e.g., based on discretion or approval of users) to the same exemplary disclosed target website as top tipping viewer 410. Further for example, the second terminal may be further configured to bind to a same interactive operation as the first terminal regarding for example the online entertainment content (e.g., exemplary disclosed livestream broadcast room content of model 430). The interactive operation may include rewarding (e.g., rewarding model 430 and/or viewers), following the creator (e.g., model 430) of the online entertainment content, commenting on the online entertainment content (e.g., comments provided in a chat of the livestream broadcast room), and/or any other suitable operations. As an illustrative example, ordinary viewers 420 may be bound by system 300 to a tipping operation of one or more top tipping viewers 410, which may include ordinary viewers 420 automatically tipping a portion (e.g., a percentage such as between 1% and 10% or any other suitable portion) of an amount tipped by top tipping viewer 410. As an illustrative example, when top tipping viewer 410 tips for example 100 tokens, ordinary viewer 420 may tip 1 token (e.g., or between 1 and 10 tokens). Alternatively in the illustrative example, when top tipping viewer 410 tips, a graphical element such as a "follow tipping" button may be displayed on the second terminal (e.g., on GUI 405) of ordinary viewers 420, and ordinary viewers 420 may activate (e.g., click on) the button to follow and tip 1 token (e.g., or another portion of the tip provided by top tipping viewer 410). For example, ordinary viewers 420 may be bound by the exemplary disclosed "follow operation" of one or more top tipping viewers 410 by system 300. When a given top tipping viewer 410 accesses a given model's live broadcast room (e.g., at target website WEB1 or WEB2) or follows a given model 430, ordinary viewers 420 (e.g., who are bound to a virtual container of that top tipping viewer 410) may be bound by system 300 to automatically follow that model.

In at least some exemplary embodiments, the second terminal may be configured to bind a same interactive operation of the exemplary disclosed first terminal on the online entertainment content (e.g., to bind the exemplary disclosed second terminals). Also for example, the exemplary disclosed interactive operation may include at least one of rewarding (e.g., rewarding users such as viewers and/or models), following a creator of the online entertainment content (e.g., model 430), and/or commenting (e.g., users commenting) on the online entertainment content.

In at least some exemplary embodiments, system 300 may provide gameplay (e.g., exclusive gameplay) and/or hidden features for a given virtual container. For example in response to a first cruise target being determined via input or control from the exemplary disclosed first terminal, system 300 may prompt a creator terminal of the creator (e.g., model 430) of the online entertainment content to configure an interactive function (e.g., exclusive gameplay and/or hidden features) that may be used for at least one of top tipping viewers 410 of the first terminal or ordinary viewers 420 of the second terminal. The exemplary disclosed creator terminal (e.g., model terminal) may be generally similar to the first terminal and/or second terminal described herein. For example, when the virtual container (e.g., cruise or any other exemplary disclosed container) created and controlled (e.g., managed) by top tipping viewer 410 accesses the model's live broadcast room, model 430 may provide a hidden tipping menu for the cruise members (e.g., top tipping viewer 410 and/or ordinary viewers 420). The exclusive gameplay may include a Blitz Mode (e.g., a fast-paced or expedited process or gameplay) or any other suitable gameplay. As an illustrative example, the exclusive gameplay may include a Blitz Mode in which the audience's tips may trigger a significant hit (e.g., a significant action in the game), which may increase control time in the game (e.g., increase an original one second control time to two or more seconds).

In at least some exemplary embodiments, in response to determining a first cruise target by the exemplary disclosed first terminal, system 300 may prompt the creator terminal of the online entertainment content (e.g., the exemplary disclosed terminal of model 430) to configure an interactive function that may be used for at least one of the first terminal or the exemplary disclosed second terminal. The interactive function may be configured in response to the interactive data between the first terminal or the second terminal and/or based on the online entertainment content (e.g., livestream broadcast of model 430) meeting one or more preset conditions.

In at least some exemplary embodiments, system 300 may provide for an operation for a given model 430 to apply to perform for a given virtual container (e.g., to perform for a given cruise container). For example, model 430 may prepare and send a request such as an invitation via the exemplary disclosed creator terminal (e.g., model terminal) to a first terminal of a given top tipping viewer 410 for a virtual container (e.g., first container 520a or second container 520b) of that top tipping viewer 410 to have his virtual container visit the model's livestream broadcast room (e.g., target website WEB1 or WEB2). When the cruise captain or manager (e.g., top tipping viewer 410) accepts the invitation from model 430 via the first terminal, system 300 may determine the model's live broadcast room (e.g., target website WEB1 or WEB2) as a cruise target (e.g., first cruise target, or a subsequent cruise target). For example in at least some exemplary embodiments, in response to determining a second browsing target (e.g., WEB2) by the exemplary disclosed first terminal, system 300 may control the exemplary disclosed second terminal to switch an access browsing target from the first browsing target (e.g., WEB1) to the second browsing target (e.g., WEB2), and may prompt the exemplary disclosed interface display of the exemplary disclosed second terminal to display the exemplary disclosed online entertainment content according to the second browsing target (e.g., WEB2).

In at least some exemplary embodiments, system 300 may determine a first cruise target via the exemplary disclosed first terminal. Determining the target may include receiving a request from the terminal of a creator of online entertainment content (e.g., model 430). In response to the first terminal accepting the request, system 300 may determine a target website (e.g., target website WEB1 or WEB2) associated with the creator of the online entertainment content as the first browsing target.

In at least some exemplary embodiments, system 300 may operate to set conditions for ordinary viewers 420 via the second terminals to join the virtual container (e.g., cruise or any other exemplary disclosed container). For example in response to an interactive operation of the second terminal in the cruise container, system 300 may obtain a virtual user identity of a second terminal and user information associated with that virtual user identity (e.g., of that ordinary viewer 420). Then, if the user information of that ordinary viewer 420 meets the conditions for joining the cruise container (e.g., or any other exemplary disclosed container), system 300 may prompt the virtual user identity of the second terminal (e.g., of that ordinary viewer 420) to join the cruise container (e.g., or any other exemplary disclosed container). Any suitable conditions (e.g., criteria) may be used, such as user's interaction data (e.g., views and usage of system 300), system membership level, viewer account balance, time a viewer spends using system 300, loyalty criteria for use of system 300, and/or any other suitable criteria. As an illustrative example, if the cruise container sets a condition for joining to be "account balance being greater than 50 tokens," when the second terminal applies to join the cruise, system 300 may detect whether the second terminal (e.g., that ordinary viewer 420) meets that condition. If the second terminal (e.g., that ordinary viewer) meets the condition, that viewer may join the virtual container (e.g., cruise or any other exemplary disclosed container). If the second terminal (e.g., that ordinary viewer) does not meet the condition, that viewer may not join the virtual container.

In at least some exemplary embodiments, system 300 may prompt a virtual user identity of the exemplary disclosed second terminal (e.g., associated with ordinary viewer 420) to join a cruise container in response to an interactive operation of the second terminal on the cruise container. System 300 may obtain the virtual user identity (e.g., of ordinary viewer 420) of the second terminal and user information associated with the virtual user identity. If the user information meets the conditions for joining the cruise container, system 300 may prompt the virtual user identity of the second terminal to join the cruise container.

In at least some exemplary embodiments, system 300 may provide multi-person screen interaction for a livestream broadcast room. System 300 may create rich entertainment effects and may increase interaction and activity in a model's live broadcast room. For example, system 300 may enhance viewer presence (e.g., viewer engagement and interaction) in the live broadcast room. Also for example, ordinary viewers 420 having relatively small reward amounts for system 300 may follow the perspective of top tipping viewers 410 of system 300 to enjoy some or substantially all increased benefits given to top tipping viewers (e.g., relatively high performance provided by models to top tipping viewers). Accordingly, system 300 may create relatively rich entertainment effects for top tipping viewers 410, ordinary viewers 420, and/or models 430.

Figure 12:
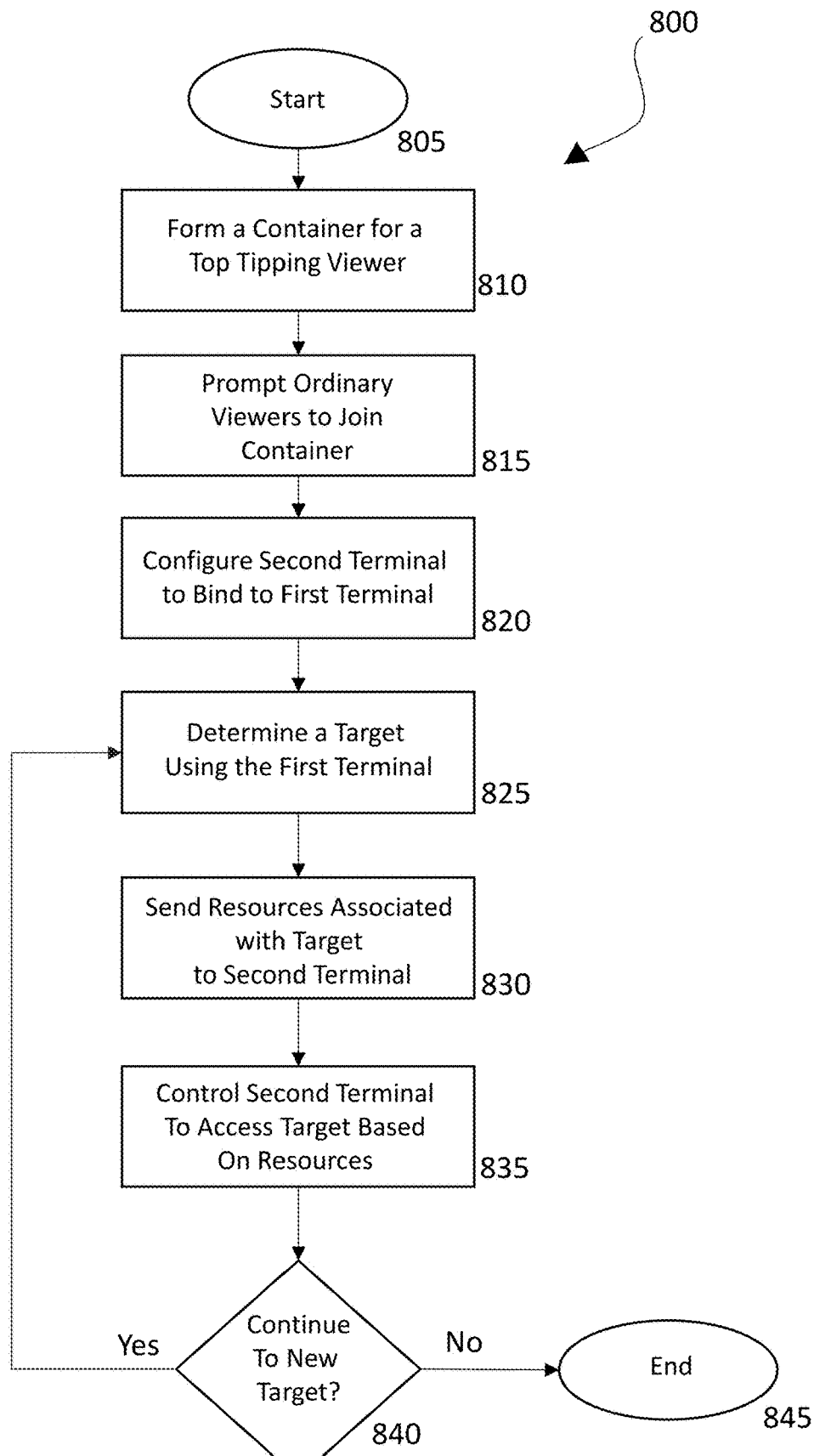
FIG. 12 is a flowchart showing an exemplary process of the present invention.

FIG. 12 illustrates an exemplary process for an operation of system 300. Process 800 begins at step 805. At step 810, system 300 may form a virtual container for top tipping viewer 410 using the exemplary disclosed first terminal for example as described above regarding FIG. 7A. At step 815, system 300 may prompt ordinary viewers 420 to join the virtual container for example as described above regarding 7B through 7D. At step 820, system 300 may configure the exemplary disclosed second terminal to bind to the first terminal for example as described above regarding FIGS. 7E and 7F. At step 825, system 300 may determine a target (e.g., target website WEB1 or WEB2) using the exemplary disclosed first terminal for example as described above. At step 830, system 300 may send resources associated with the exemplary disclosed target (e.g., target website WEB1 or WEB2) to one or more second terminals for example as described above regarding FIGS. 7E and 7F. At step 835, system 300 may control the second terminal to access the exemplary disclosed target (e.g., target website WEB1 or WEB2) based on the exemplary disclosed resources. At step 840, system 300 may determine whether or not the exemplary disclosed virtual container is to continue to a new target (e.g., to continue from first target website WEB1 to second target website WEB2) based on control by top tipping viewer 410. For example because ordinary viewers 420 may be bound to top tipping viewer 410 for example as described above, system 300 may determine whether the virtual container is to continue to a new target based on control by top tipping viewer 410 (e.g., via GUI 405 of the exemplary disclosed first terminal) and/or any other suitable criteria (e.g., predetermined algorithms, artificial intelligence operations, and/or any other suitable technique). If the virtual container is to continue to a new target, process 800 may return to step 825. As many iterations as desired of steps 825 through 840 may be performed. If the virtual container is not to continue to a new target, process 800 ends at step 845.

The invention includes other illustrative embodiments ("Embodiments") as follows.

Embodiment 1: An interactive method, comprising: forming, via a system, one or more virtual containers, wherein the one or more virtual containers are managed by at least one of a first terminal associated with a first user or a service provider, wherein managing the virtual containers includes managing a browsing target that includes a target website for browsing online entertainment content; appending, via the system, a virtual user identity of a second terminal associated with a second user to the one or more virtual containers, in response to an interactive operation of the second terminal on the one or more virtual containers; configuring, via the system, the second terminal to bind to the browsing target, which is the same browsing target as the first terminal; sending, via the system, associated resources that are associated with the browsing target to the second terminal, in response to determining the browsing target by the first terminal; and in response to determining a first browsing target by the first terminal: controlling via the system the second terminal to access the first browsing target according to the associated resources, and prompting via the system an interface display of the second terminal to display the online entertainment content according to the first browsing target that is the same as the online entertainment content displayed on at least a part of an interface display of the first terminal.

Embodiment 2: The interactive method of Embodiment 1, further comprising, in response to determining a second browsing target by the first terminal: controlling, via the system, the second terminal to switch an access browsing target from the first browsing target to the second browsing target; and prompting, via the system, an interface display of the second terminal to display the online entertainment content according to the second browsing target.

Embodiment 3: The interactive method of Embodiment 1, wherein the step of sending, via the system, the associated resources that are associated with the browsing target to the second terminal, in response to determining the browsing target by the first terminal includes: detecting a URL (Uniform Resource Locator) of a current target accessed by the first terminal; when the URL of the current target meets predetermined conditions, confirming that the current target is the browsing target, and obtaining the URL of the browsing target; and sending the associated resources containing the URL of the browsing target to the second terminal.

Embodiment 4: The interactive method of Embodiment 1, wherein the step of sending, via the system, the associated resources that are associated with the browsing target to the second terminal, in response to determining the browsing target by the first terminal includes: obtaining rendering resources of a target website corresponding to the browsing target; and sending the rendering resources of the target website to the second terminal.

Embodiment 5: The interactive method of Embodiment 1, wherein the one or more virtual containers are cruise containers that are displayed including a graphical element of a yacht or a ship via at least one of the interface display of the first terminal or the interface display of the second terminal.

Embodiment 6: The interactive method of Embodiment 1, wherein: the first terminal is associated with a top tipping viewer; and the second terminal is associated with an ordinary viewer who provides less tips via the system than the top tipping viewer.

Embodiment 7: The interactive method of Embodiment 1, further comprising: in response to determining the browsing target by the first terminal, via the system, configuring interactive data for at least one of the first terminal, the second terminal, or a management terminal of a creator of the online entertainment content, wherein the interactive data is configured to interact with the online entertainment content.

Embodiment 8: The interactive method of Embodiment 7, wherein the interactive data includes a rewards tip for the creator of the online entertainment content.

Embodiment 9: The interactive method of Embodiment 7, wherein the interactive data includes rendering special effects in the interface display of the online entertainment content of a terminal that is accessing the online entertainment content.

Embodiment 10: The interactive method of Embodiment 7, wherein the interactive data includes at least one of control permission or synchronous control permission of at least one adult toy of the creator of the online entertainment content.

Embodiment 11: The interactive method of Embodiment 7, wherein the interactive data is associated with characteristic data of the one or more virtual containers.

Embodiment 12: The interactive method of Embodiment 7, wherein the interactive data is configured to be generated by a content interactive operation between the first terminal and the online entertainment content, and then provided to the second terminal, wherein the content interactive operation between the first terminal and the online entertainment content includes first terminal tips rewards to the creator of the online entertainment content.

Embodiment 13: The interactive method of Embodiment 1, wherein the one or more virtual containers are configured to be created by the first terminal via the system.

Embodiment 14: The interactive method of Embodiment 1, wherein the step of determining, via the system, the browsing target by the first terminal includes receiving a request from a creator terminal of a creator of the online entertainment content; and in response to the first terminal accepting the request, determining the target website, which is associated with the creator of the online entertainment content, as the browsing target.

Embodiment 15: The interactive method of Embodiment 1, wherein the step of controlling, via the system, the second terminal to access the browsing target according to the associated resources and the step of prompting, via the system, the interface display of the second terminal to display the online entertainment content includes: controlling the second terminal to access the browsing target according to the associated resources and prompting the interface display of the second terminal to display the online entertainment content through a preconfigured rendering window or a browser tab of the second terminal.

Embodiment 16: The interactive method of Embodiment 1, wherein the step of appending, via the system, the virtual user identity of the second terminal to the one or more virtual containers, in response to the interactive operation of the second terminal on the one or more virtual containers, includes: obtaining the virtual user identity of the second terminal; obtaining user information associated with the virtual user identity; and if the user information meets conditions for joining the one or more virtual containers, appending the virtual user identity of the second terminal to the one or more virtual containers.

Embodiment 17: The interactive method of Embodiment 1, wherein: the second terminal is configured to bind to the interactive operation, which is the same interactive operation as the first terminal, on the online entertainment content; and the interactive operation includes at least one of rewarding, following a creator of the online entertainment content, or commenting on the online entertainment content.

Embodiment 18: The interactive method of Embodiment 1, further comprising in response to the step of determining the browsing target by the first terminal, via the system, prompting a creator terminal of the online entertainment content to configure an interactive function for use by at least one of the first terminal or the second terminal.

Embodiment 19: The interactive method of Embodiment 18, wherein the interactive function is configured based on interactive data between at least one of the first terminal or the second terminal and the online entertainment content meeting one or more preset conditions.

Embodiment 20: A system, comprising: at least one module comprising computer-executable code stored in non-volatile memory; and a memory for storing instructions and a processor for executing the instructions. The computer-executable code, when operating on the processor, causes the system to form, via the system, one or more virtual containers, wherein the one or more virtual containers are managed by at least one of a first terminal or a service provider; form, via the system, one or more virtual containers, wherein the one or more virtual containers are managed by at least one of a first terminal associated with a first user or a service provider, wherein managing the virtual containers includes managing a browsing target that includes a target website for browsing online entertainment content, and append, via the system, a virtual user identity of a second terminal associated with a second user to the one or more virtual containers, in response to an interactive operation of the second terminal on the one or more virtual containers. The first terminal and the second terminal of the one or more virtual containers are configured to access a target that includes a target website for browsing online entertainment content. The computer-executable code, when operating on the processor, also causes the system to configure, via the system, the second terminal to bind to the browsing target, which is the same browsing target as the first terminal; send, via the system, associated resources that are associated with the browsing target to the second terminal, in response to determining the browsing target by the first terminal; and in response to determining a first browsing target by the first terminal: control via the system the second terminal to access the first browsing target according to the associated resources, and prompt via the system an interface display of the second terminal to display the online entertainment content according to the first browsing target that is the same as the online entertainment content displayed on at least a part of an interface display of the first terminal.

Embodiment 21: A non-transitory computer-readable storage medium, comprising: machine-readable instructions, wherein the machine-readable instructions, when executed by a processor of a controller, cause the controller to: form, via a system, one or more virtual containers, wherein the one or more virtual containers are managed by at least one of a first terminal associated with a first user or a service provider, wherein managing the virtual containers includes managing a browsing target that includes a target website for browsing online entertainment content; append, via the system, a virtual user identity of a second terminal associated with a second user to the one or more virtual containers, in response to an interactive operation of the second terminal on the one or more virtual containers; configure, via the system, the second terminal to bind to the browsing target, which is the same browsing target as the first terminal; send, via the system, associated resources that are associated with the browsing target to the second terminal, in response to determining the browsing target by the first terminal; and in response to determining a first browsing target by the first terminal: control via the system the second terminal to access the first browsing target according to the associated resources, and prompt via the system an interface display of the second terminal to display the online entertainment content according to the first browsing target that is the same as the online entertainment content displayed on at least a part of an interface display of the first terminal.

The exemplary disclosed system and method may provide an efficient and effective technique for increasing interaction and activity levels in a livestream broadcast room. For example, the exemplary disclosed system and method may provide an efficient and effective technique for increasing interaction by an increased number of viewers in a livestream broadcast room. The exemplary disclosed system and method may cause more viewers to interact with a model, thereby increasing entertainment, social, and/or monetary benefits of the livestream broadcast room for top tipping viewers, ordinary viewers, and/or models.

In at least some exemplary embodiments, the exemplary disclosed system and method may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Figure 13:
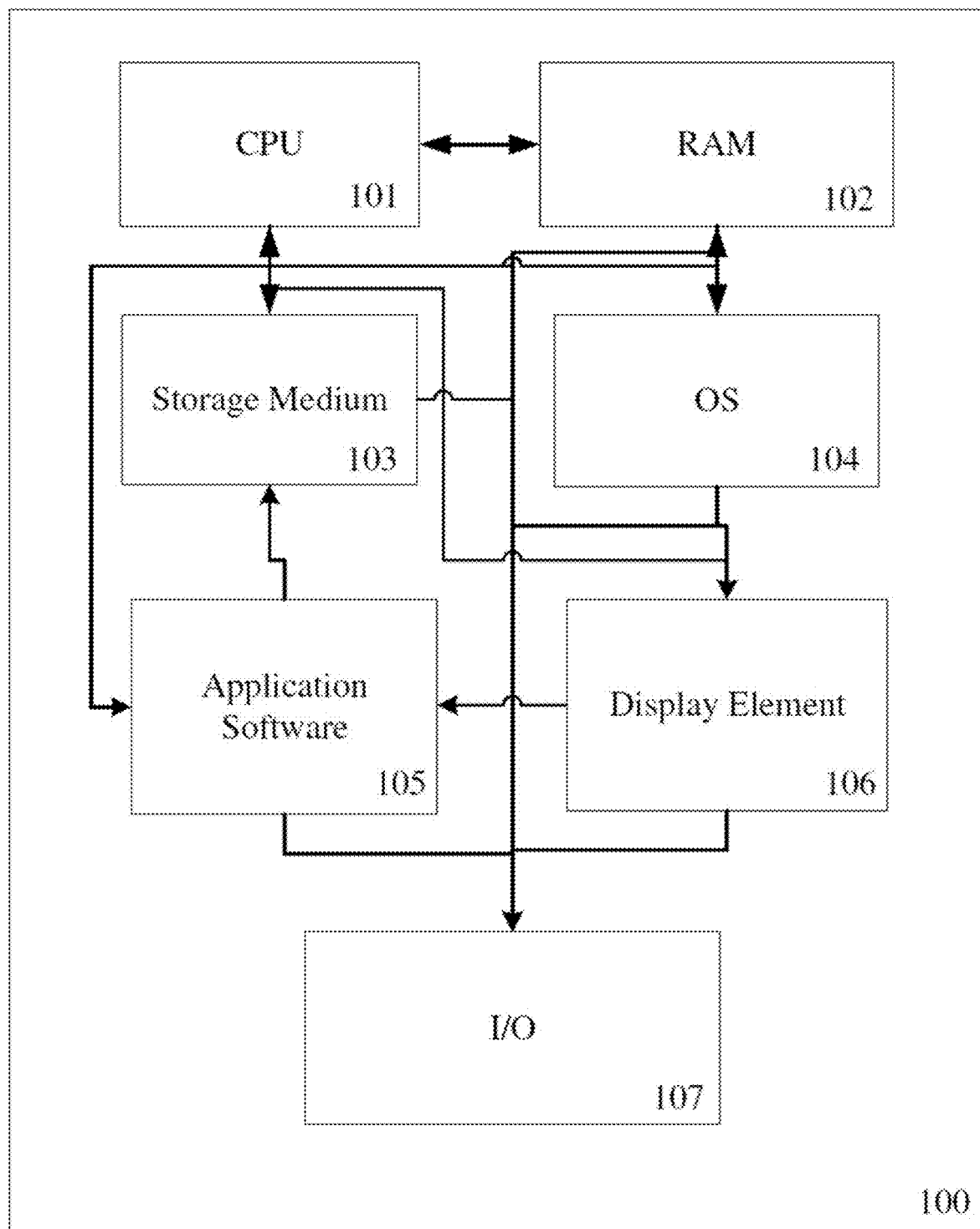
FIG. 13 is a schematic illustration of an exemplary computing device, in accordance with at least some exemplary embodiments of the present disclosure.

An illustrative representation of a computing device appropriate for use with embodiments of the system of the present disclosure is shown in FIG. 13. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 14, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 14:
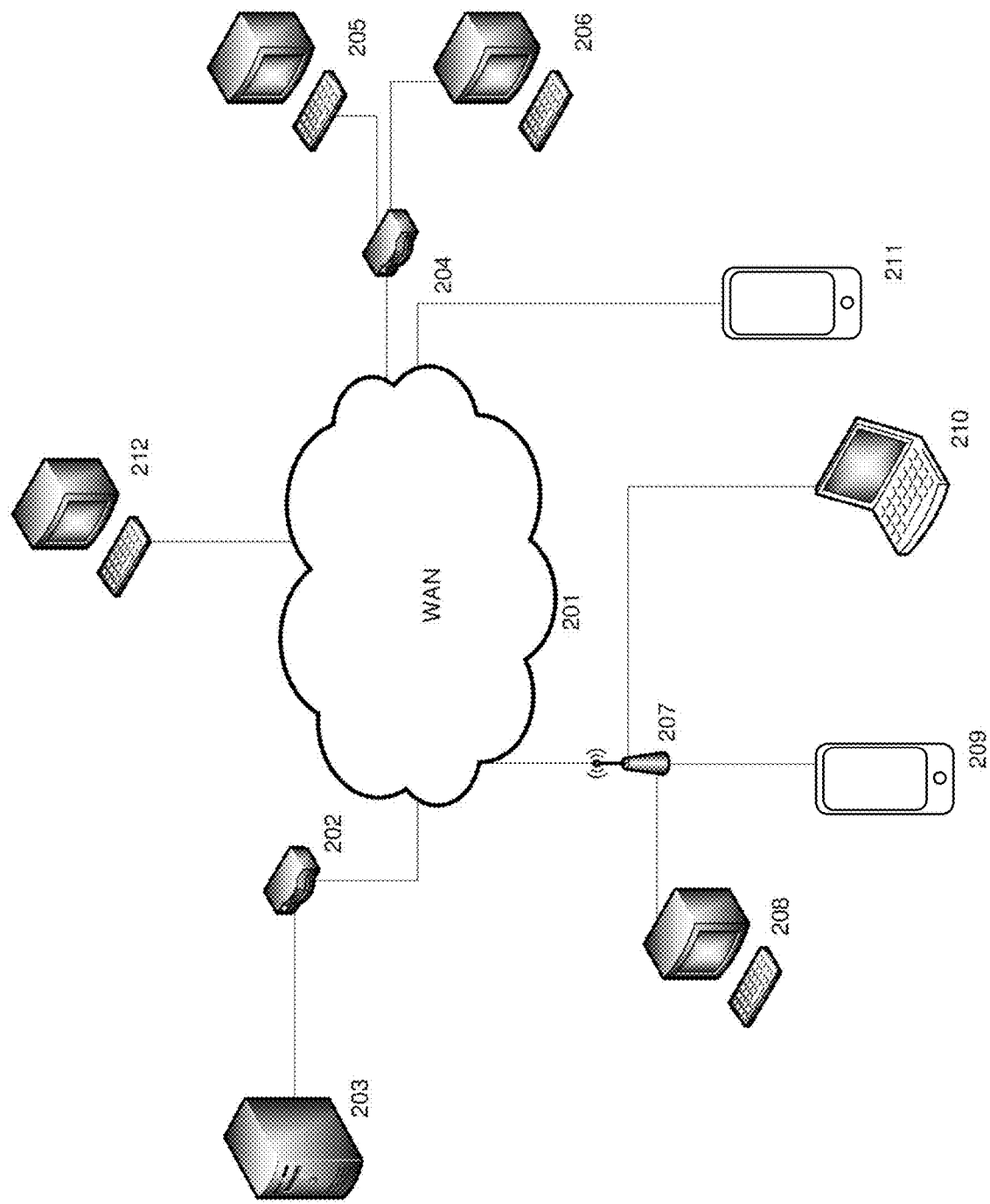
FIG. 14 is a schematic illustration of an exemplary network, in accordance with at least some exemplary embodiments of the present disclosure.

Referring to FIG. 14, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 14, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on-any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. An interactive method, comprising:
   forming, via a system, one or more virtual containers, wherein the one or more virtual containers are managed by at least one of a first terminal associated with a first user or a service provider, wherein managing the virtual containers includes managing a browsing target that includes a target website for browsing online entertainment content;
   appending, via the system, a virtual user identity of a second terminal associated with a second user to the one or more virtual containers, in response to an interactive operation of the second terminal on the one or more virtual containers;
   configuring, via the system, the second terminal to bind to the browsing target, which is the same browsing target as the first terminal;
   sending, via the system, associated resources that are associated with the browsing target to the second terminal, in response to determining the browsing target by the first terminal; and
   in response to determining a first browsing target by the first terminal:
      controlling via the system the second terminal to access the first browsing target according to the associated resources, and
      prompting via the system an interface display of the second terminal to display the online entertainment content according to the first browsing target that is the same as the online entertainment content displayed on at least a part of an interface display of the first terminal.

2. The interactive method of claim 1, further comprising, in response to determining a second browsing target by the first terminal:
controlling, via the system, the second terminal to switch an access browsing target from the first browsing target to the second browsing target; and
prompting, via the system, an interface display of the second terminal to display the online entertainment content according to the second browsing target.

3. The interactive method of claim 1, wherein the step of sending, via the system, the associated resources that are associated with the browsing target to the second terminal, in response to determining the browsing target by the first terminal includes:
detecting a URL (Uniform Resource Locator) of a current target accessed by the first terminal;
when the URL of the current target meets predetermined conditions, confirming that the current target is the browsing target, and obtaining the URL of the browsing target; and
sending the associated resources containing the URL of the browsing target to the second terminal.

4. The interactive method of claim 1, wherein the step of sending, via the system, the associated resources that are associated with the browsing target to the second terminal, in response to determining the browsing target by the first terminal includes:
obtaining rendering resources of a target website corresponding to the browsing target; and
sending the rendering resources of the target website to the second terminal.

5. The interactive method of claim 1, wherein the one or more virtual containers are cruise containers that are displayed including a graphical element of a yacht or a ship via at least one of the interface display of the first terminal or the interface display of the second terminal.

6. The interactive method of claim 1, wherein:
the first terminal is associated with a top tipping viewer; and
the second terminal is associated with an ordinary viewer who provides less tips via the system than the top tipping viewer.

7. The interactive method of claim 1, further comprising:
in response to determining the browsing target by the first terminal, via the system, configuring interactive data for at least one of the first terminal, the second terminal, or a management terminal of a creator of the online entertainment content, wherein the interactive data is configured to interact with the online entertainment content.

8. The interactive method of claim 7, wherein the interactive data includes a rewards tip for the creator of the online entertainment content.

9. The interactive method of claim 7, wherein the interactive data includes rendering special effects in the interface display of the online entertainment content of a terminal that is accessing the online entertainment content.

10. The interactive method of claim 7, wherein the interactive data includes at least one of control permission or synchronous control permission of at least one adult toy of the creator of the online entertainment content.

11. The interactive method of claim 7, wherein the interactive data is associated with characteristic data of the one or more virtual containers.

12. The interactive method of claim 7, wherein the interactive data is configured to be generated by a content interactive operation between the first terminal and the online entertainment content, and then provided to the second terminal, wherein the content interactive operation between the first terminal and the online entertainment content includes first terminal tips rewards to the creator of the online entertainment content.

13. The interactive method of claim 1, wherein the one or more virtual containers are configured to be created by the first terminal via the system.

14. The interactive method of claim 1, wherein the step of determining, via the system, the browsing target by the first terminal includes:
receiving a request from a creator terminal of a creator of the online entertainment content; and
in response to the first terminal accepting the request, determining the target website, which is associated with the creator of the online entertainment content, as the browsing target.

15. The interactive method of claim 1, wherein the step of controlling, via the system, the second terminal to access the browsing target according to the associated resources and the step of prompting, via the system, the interface display of the second terminal to display the online entertainment content includes:
controlling the second terminal to access the browsing target according to the associated resources and prompting the interface display of the second terminal to display the online entertainment content through a preconfigured rendering window or a browser tab of the second terminal.

16. The interactive method of claim 1, wherein the step of appending, via the system, the virtual user identity of the second terminal to the one or more virtual containers, in response to the interactive operation of the second terminal on the one or more virtual containers, includes:
obtaining the virtual user identity of the second terminal;
obtaining user information associated with the virtual user identity; and
if the user information meets conditions for joining the one or more virtual containers, appending the virtual user identity of the second terminal to the one or more virtual containers.

17. The interactive method of claim 1, wherein:
the second terminal is configured to bind to the interactive operation, which is the same interactive operation as the first terminal, on the online entertainment content; and
the interactive operation includes at least one of rewarding, following a creator of the online entertainment content, or commenting on the online entertainment content.

18. The interactive method of claim 1, further comprising in response to the step of determining the browsing target by the first terminal, via the system, prompting a creator terminal of the online entertainment content to configure an interactive function for use by at least one of the first terminal or the second terminal.

19. The interactive method of claim 18, wherein the interactive function is configured based on interactive data between at least one of the first terminal or the second terminal and the online entertainment content meeting one or more preset conditions.

20. A system, comprising:
at least one module comprising computer-executable code stored in non-volatile memory; and a memory for storing instructions and a processor for executing the instructions;

wherein the computer-executable code, when operating on the processor, causes the system to:

form, via the system, one or more virtual containers, wherein the one or more virtual containers are managed by at least one of a first terminal associated with a first user or a service provider, wherein managing the virtual containers includes managing a browsing target that includes a target website for browsing online entertainment content;

append, via the system, a virtual user identity of a second terminal associated with a second user to the one or more virtual containers, in response to an interactive operation of the second terminal on the one or more virtual containers;

configure, via the system, the second terminal to bind to the browsing target, which is the same browsing target as the first terminal;

send, via the system, associated resources that are associated with the browsing target to the second terminal, in response to determining the browsing target by the first terminal; and in response to determining a first browsing target by the first terminal:

control via the system the second terminal to access the first browsing target according to the associated resources, and prompt via the system an interface display of the second terminal to display the online entertainment content according to the first browsing target that is the same as the online entertainment content displayed on at least a part of an interface display of the first terminal.

21. A non-transitory computer-readable storage medium, comprising:

machine-readable instructions, wherein the machine-readable instructions, when executed by a processor of a controller, cause the controller to:

form, via a system, one or more virtual containers, wherein the one or more virtual containers are managed by at least one of a first terminal associated with a first user or a service provider, wherein managing the virtual containers includes managing a browsing target that includes a target website for browsing online entertainment content;

append, via the system, a virtual user identity of a second terminal associated with a second user to the one or more virtual containers, in response to an interactive operation of the second terminal on the one or more virtual containers;

configure, via the system, the second terminal to bind to the browsing target, which is the same browsing target as the first terminal;

send, via the system, associated resources that are associated with the browsing target to the second terminal, in response to determining the browsing target by the first terminal; and in response to determining a first browsing target by the first terminal:

control via the system the second terminal to access the first browsing target according to the associated resources, and prompt via the system an interface display of the second terminal to display the online entertainment content according to the first browsing target that is the same as the online entertainment content displayed on at least a part of an interface display of the first terminal.

\* \* \* \* \*